(12) United States Patent
Iihoshi et al.

(10) Patent No.: US 6,772,585 B2
(45) Date of Patent: Aug. 10, 2004

(54) CONTROLLER OF COMPRESSION-IGNITION ENGINE

(75) Inventors: Yoichi Iihoshi, Tsuchiura (JP); Shiro Yamaoka, Hitachi (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/255,703

(22) Filed: Sep. 27, 2002

(65) Prior Publication Data

US 2003/0061803 A1 Apr. 3, 2003

(30) Foreign Application Priority Data

Sep. 28, 2001 (JP) ........................................ 2001-302994

(51) Int. Cl.⁷ ................................................. F01N 3/00
(52) U.S. Cl. ............................. 60/277; 60/276; 60/285; 60/297; 123/295; 123/305
(58) Field of Search .......................... 60/274, 276, 277, 60/285, 286, 295, 297, 301; 123/300, 305, 688, 295

(56) References Cited

U.S. PATENT DOCUMENTS 5,437,153 A  *  8/1995  Takeshima et al. ........... 60/276
6,230,683 B1 *  5/2001  zur Loye et al. ............ 123/435
6,341,487 B1 *  1/2002  Takahashi et al. ............ 60/286
6,354,264 B1 *  3/2002  Iwakiri et al. .............. 123/305
6,378,295 B1 *  4/2002  Heinze ........................ 60/274
6,494,036 B2 * 12/2002  Schnaibel et al. ............ 60/277
6,520,142 B2 *  2/2003  Nogi et al. ................. 123/299

FOREIGN PATENT DOCUMENTS

| JP | 62-15722 | 1/1987 |
| JP | 11-6435 | 1/1999 |
| JP | 11-336600 | 12/1999 |

* cited by examiner

Primary Examiner—Binh Q. Tran
(74) Attorney, Agent, or Firm—Crowell & Moring LLP

(57) ABSTRACT

A control system for a compression injection engine can prevent deterioration in exhaust purification at the time of the switching of combustion between spark ignition and compression ignition, at the time of said spark ignition combustion and said compression injection combustion, and can diagnose any deterioration of an NO x detector and a three way catalyst. The control system includes a catalytic converter installed within an exhaust passage of the compression ignition engine for compressing and igniting a pre-mixture of a fuel and air, an air/fuel ratio detector for detecting an air/fuel ratio at upstream side of said catalytic converter, and an $NO_x$ detector for detecting $NO_x$ at downstream side of said catalytic converter.

24 Claims, 22 Drawing Sheets

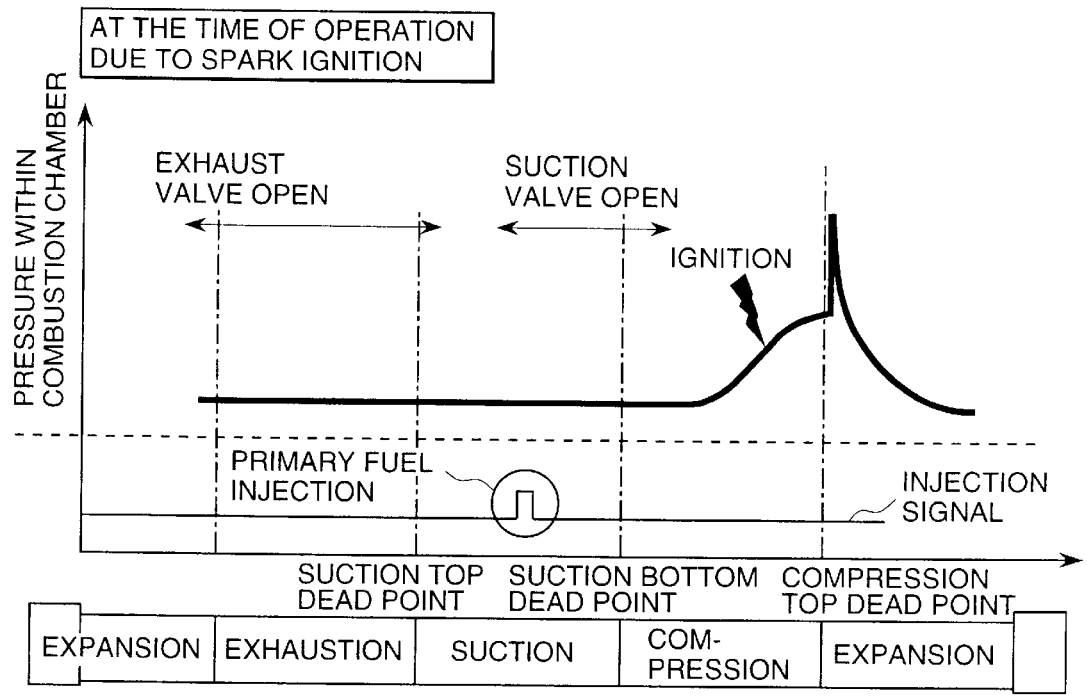
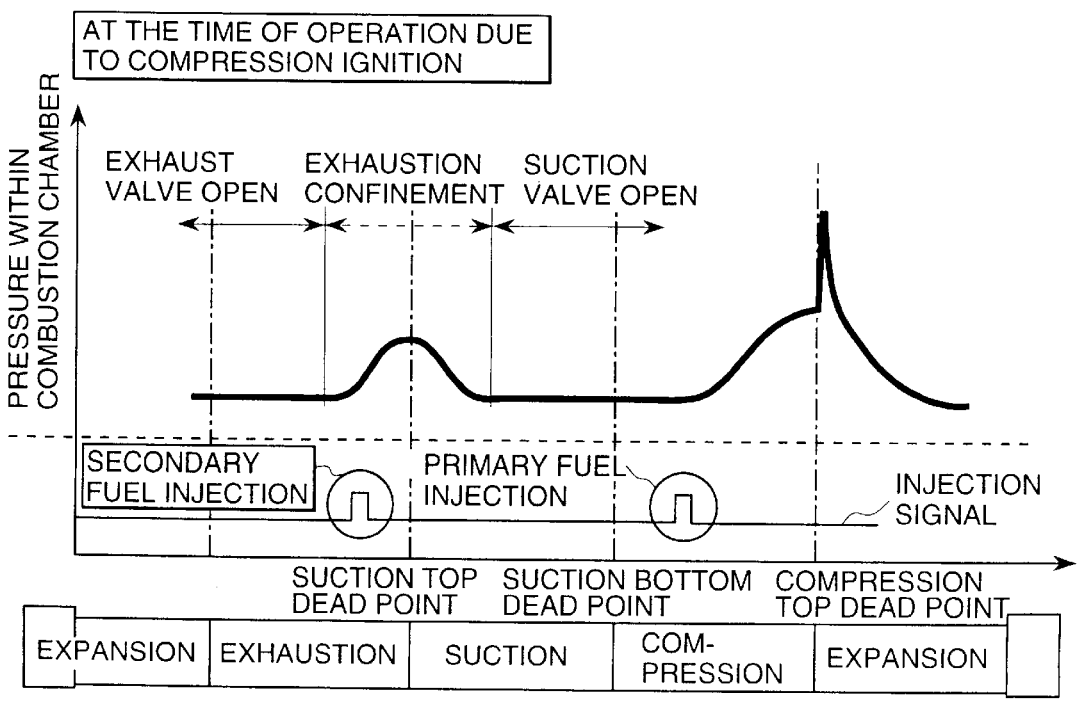

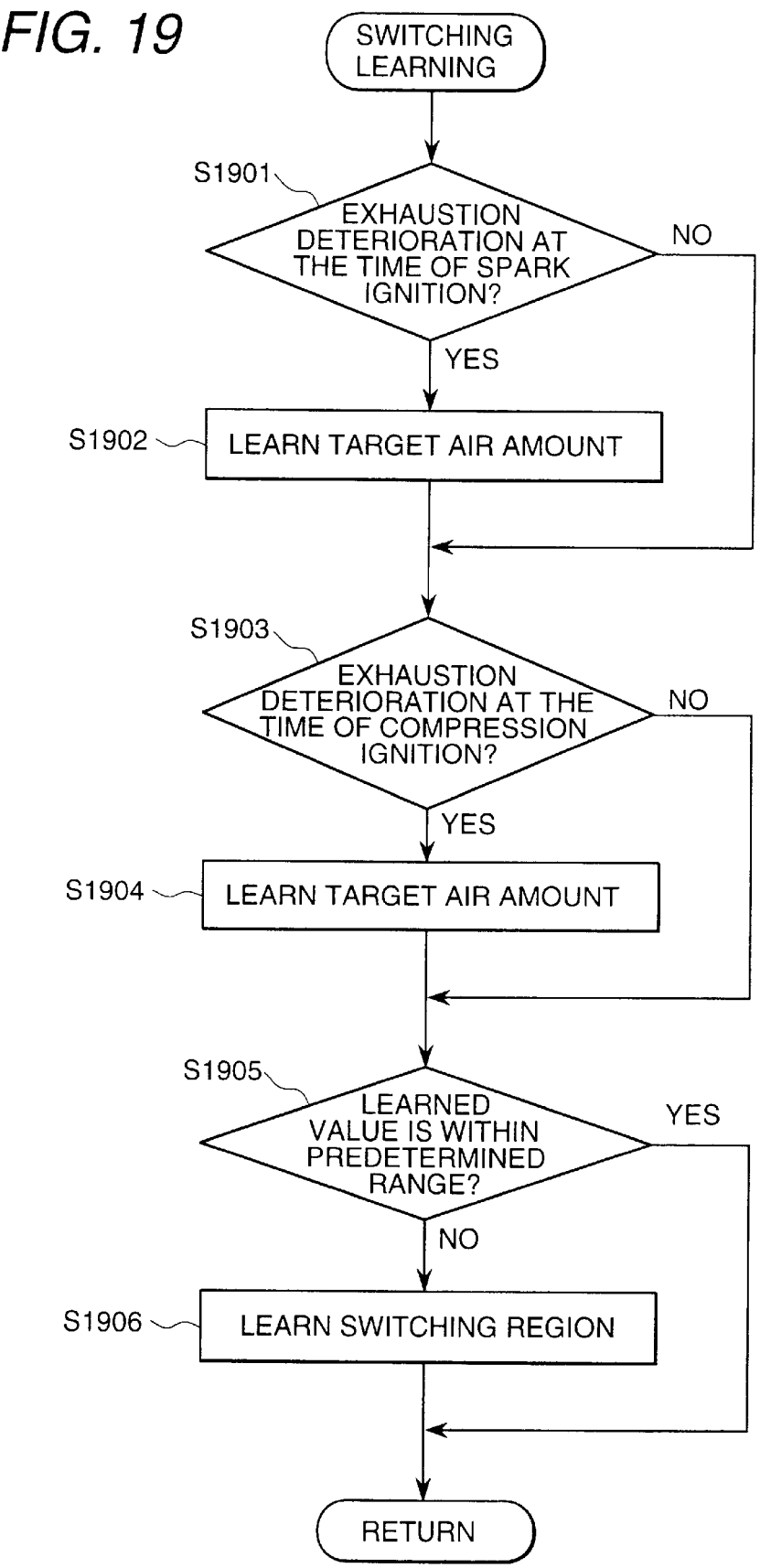

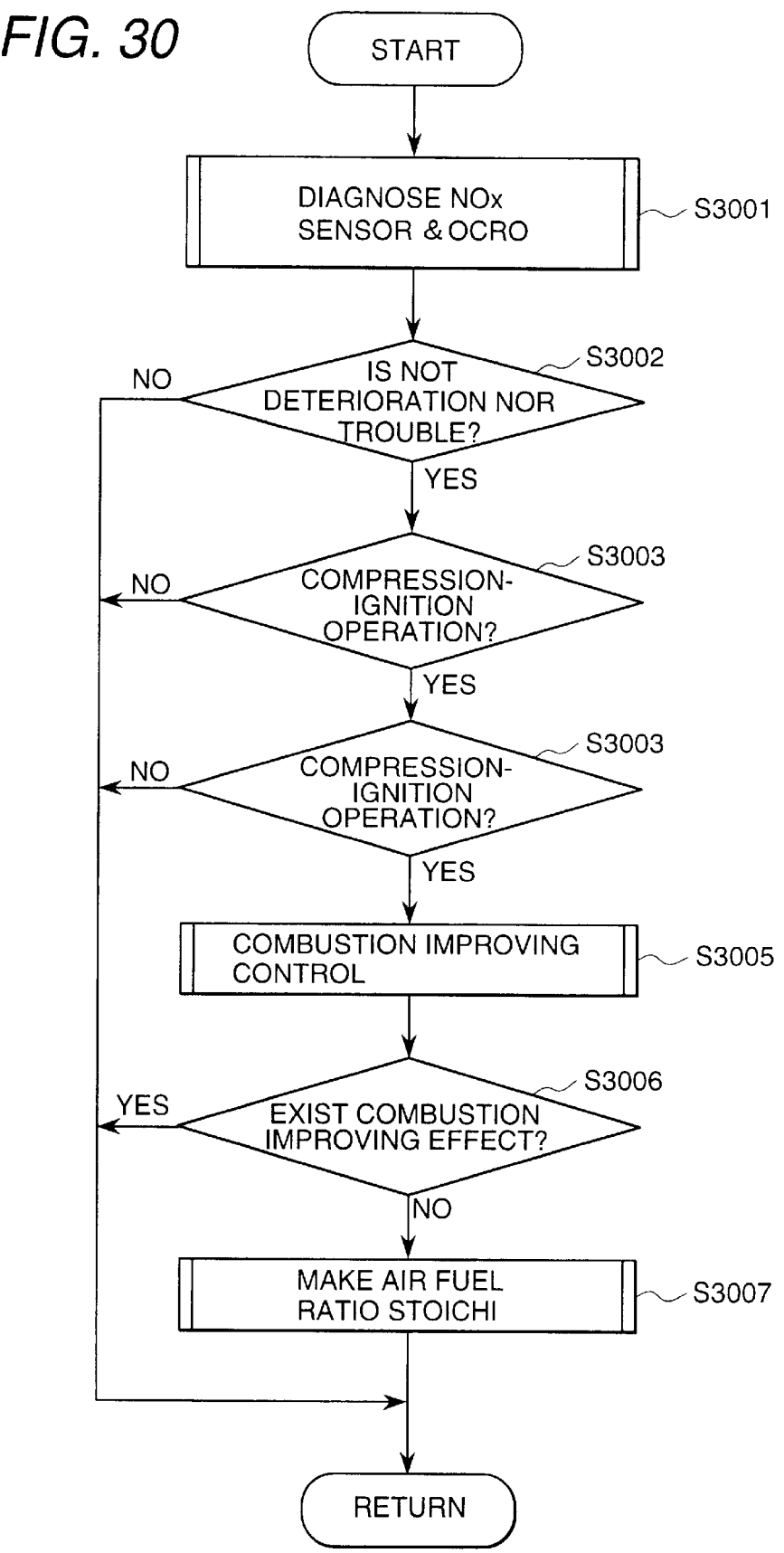

CONTROLLER OF COMPRESSION-IGNITION ENGINE

BACKGROUND OF THE INVENTION

The present invention relates to a controller or control system of a compression ignition engine. Particularly, the present invention relates to the controller of the compression ignition engine for preventing any deterioration in exhaust gas purification at a transition between spark ignition operation and compression ignition operation and during the compression ignition.

The conventional lean-burn engines can improve fuel economy as the result of the effect of pumping loss decrease, and the like.

However, there is a problem that $NO_x$ during the lean operation cannot be purified with three way catalyst. Therefore, the technology of a compression ignition engine which can suppress the $NO_x$ of engine out to several ppms in the lean mixture condition is proposed as one of the solutions of this problem (for instance, see Japanese Patent Application Laid-Open No. Sho 62-15722 Official Gazette, etc.). The compression ignition engine which has been described in the Official Gazette, by charging a pre-mixed air/fuel mixture for self-ignition, enables combustion at a combustion temperature lower than the temperature 1800° K. at which $NO_x$ generates (FIG. 1).

However, it should be difficult to achieve the compression ignition at the time of engine starting, at the time of high load range of engine operation or the like and it is needed to switch the compression ignition range of engine operation, and the spark ignition range by a sparking plug depending upon the operation range or the state of the engine, as pointed out also with the Official Gazette (FIG. 2). The technology of the controller of the compression ignition engine which achieves this has been proposed (for instance, see Japanese Patent Application Laid-Open No. Hei 11-6435 Official Gazette). The compression ignition engine which has been described in this Official Gazette detects ignition timing based on an ionic current within a combustion chamber. Abnormal combustion is prevented by switching the combustion when a difference between the detected ignition timing and the spark ignition timing of a sparking plug becomes lower than a predetermined value. In another way, $NO_x$ under exhaust is detected, and the combustion is switched based on the change in the density of $NO_x$. This technology prevents the combustion from becoming unstable (as proposed technology, see Japanese Patent Application Laid-Open No. Hei 11-336600). At this time, the deterioration in exhaust gas purification due to the miss-firing can be prevented by appropriately judging the timing of the switching.

By the way, the catalyst which purifies the exhaust is not considered even though the conventional technology can prevent the deterioration in exhaust gas purification due to the abnormal combustion possibly caused in transition between the compression ignition and the spark ignition. Therefore, even in the state that the exhaust cannot be purified with the catalyst, the switching for the combustion is carried out, and it occurs a possibility to deprave the exhaust discharged in atmosphere. Namely, if the air/fuel ratio becomes excessively lean condition at the time of switching when the three way catalyst is provided in an exhaust pipe, $NO_x$ is exhausted as it is without being purified. On the contrary, if the air/fuel ratio becomes excessively rich condition, HC and CO are exhausted without being purified.

Moreover, when the compression ignition is carried out in a lean air/fuel ratio, $NO_x$ cannot be purified with the three way catalyst. Therefore, it necessitates any means by which $NO_x$ exhausted from the engine at this time is prevented from deteriorating.

That is, the inventors of the present invention have found that it is possible to monitor the fact that the exhaust gas is purified with the catalyst at the switching transition between the spark ignition mode operation and the compression ignition mode operation by using a three way catalyst and an $NO_x$ detector located at the downstream side of the three way catalyst, and it is possible to monitor the fact that the combustion aggravates also at the time of the compression ignition mode operation. They found that on the basis of this knowledge a system which achieves this can be provided with a minimum system structure. The above-mentioned prior art techniques do not have at all special consideration about this.

SUMMARY OF THE INVENTION

The present invention has been worked out in view of the problems set forth above. One object of the present invention is to provide a control system for a compression injection engine which can prevent deterioration in exhaust purification at the time of the switching of combustion between spark ignition and compression ignition, at the time of the spark ignition combustion and the compression injection combustion, and can diagnose any deterioration of an NO x detector and a three way catalyst.

In order to accomplish the above-mentioned object, a control system for a compression ignition engine comprises:
  a catalytic converter installed within an exhaust passage of the compression ignition engine for compressing and igniting a pre-mixture of a fuel and air;
  an air/fuel ratio detector for detecting an air/fuel ratio at upstream side of the catalytic converter; and
  an $NO_x$ detector for detecting $NO_x$ at downstream side of the catalytic converter.

The control system for the compression ignition engine according to the present invention, constructed as set forth above, is provided with the $NO_x$ detector located downstream side of the catalytic converter. Since engine control is performed on the basis of the $NO_x$ detection value, a minimum system of the compression ignition engine can be constructed. Furthermore, with the construction set forth above, prevention of deterioration of exhaust gas purification performance can be achieved upon switching of combustion mode between spark ignition and compression ignition in addition to combustion in the spark ignition mode and compression ignition mode, and prevention of deterioration of exhaust gas purification performance by diagnosis of the $NO_x$ sensor, the catalytic converter and so forth.

On the other hand, the particular mode of implementation of the control system of the compression ignition engine according to the present invention may use an output signal of the $NO_x$ detector for preventing deterioration of exhaust gas purification performance. In the alternative, the control system may prevent deterioration of exhaust gas purification performance upon switching transition of combustion mode between spark ignition and compression ignition, during spark ignition mode combustion and during compression ignition mode combustion.

In another aspect of the invention, the control system may further comprise:
  combustion mode switching means for switching between a spark ignition mode and compression ignition mode;

exhaust deterioration factor predicting means for predicting a factor causing deterioration of exhaust gas purification performance on the basis of an $NO_x$ detection value upon switching transition of the combustion mode; and switching learning means for leaning control amount and control object of the combustion mode switching means on the basis of the factor causing deterioration of exhaust gas purification performance. More particularly, the switching learning means learns a spark ignition timing, a throttle valve control amount, a fuel injection amount, a fuel cut-off period before switching to the compression ignition mode combustion, one of a target intake air flow rate and a target EGR amount or an engine operational range for switching combustion mode between the spark ignition mode combustion and the compression ignition mode combustion.

In a further aspect of the present invention, the control system performs fuel injection between an expansion stroke and an exhaust stroke in the compression ignition mode combustion. The control system may comprise:

air/fuel ratio control means for controlling an output of the air/fuel ratio detector toward a target air/fuel ratio;

a target air/fuel ratio calculating means for calculating the target air/fuel ratio for optimizing purification ratio of the catalytic converter, the target air/fuel ratio calculating means calculates the target air/fuel ratio on the basis of an output signal of the $NO_x$ detector. The control system may temporarily sets the target air/fuel ratio rich side when the $NO_x$ detection value exceeds a predetermined value. The control system may comprise $NO_x$ detector diagnosis means for diagnosing abnormality of the $NO_x$ detector for controlling the air/fuel ratio so that an output of the air-fuel ratio detector becomes stoichiometric value. The control system may further comprise combustion deterioration detecting means for detecting deterioration of combustion on the basis of an $NO_x$ detection value in the compression ignition mode combustion. The combustion deterioration detecting means may detect deterioration of combustion in the compression ignition mode combustion when an output of the air/fuel ratio detector indicates a lean mixture condition. The control system may further comprise combustion improvement control means for controlling improvement of combustion in the compression ignition mode when deterioration of combustion is detected by the combustion deterioration detecting means. The control system may control the air/fuel ratio so that the output of the air/fuel ratio detector becomes stoichiometric value when deterioration of combustion is detected by the exhaust deterioration detecting means after implementation of the combustion improvement control means. The control system may further comprise air/fuel ratio detector diagnosing means for detecting abnormality of the air/fuel ratio detector, for correcting a fuel injection amount on the basis of the output signal of the $NO_x$ detector when abnormality of the air/fuel ratio detector is detected. The control system thus prevents deterioration of exhaust gas purification performance by detecting fatigue of at least one of the $NO_x$ detector and the catalytic converter.

On the other hand, the control system may comprise fuel cut-off means for interrupting fuel injection during deceleration, and fatigue of $NO_x$ detector may be detected on the basis of the output signal of the $NO_x$ detector during fuel cut-off. The control system comprises fuel recovery means for recovering fuel injection after fuel cut-off, abnormality of the $NO_x$ detector may be judged when a difference the $NO_x$ detection value during fuel recovery and the $NO_x$ detection value during fuel cut-off is less than or equal to a predetermined value. The control system may further comprise air/fuel ratio control means for controlling air/fuel ratio so that an output of the air/fuel ratio detector becomes close to a target air/fuel ratio, for diagnosis of fatigue of the catalytic converter on the basis of the output signal of the $NO_x$ detector when the target air/fuel ratio is set at stoichiometric value.

In addition, an automotive vehicle has a control system for a compression ignition engine constructed as set forth above.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 4 is a view showing one-cycle control at the time of spark ignition operation due to the use of the engine control device of FIG. 3;

FIG. 5 is a view showing one-cycle control at the time of compression ignition operation due to the use of the engine control device of FIG. 3;

FIG. 19 is an operation flow chart of a switching leaning part in FIG. 11;

FIG. 30 is an operation flow chart of the exhaust control when the compression ignition is driven with the engine control device to which the diagnosis device of FIG. 3 is comprised.

DETAILED DESCRIPTION OF THE PREFERRED EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 3:
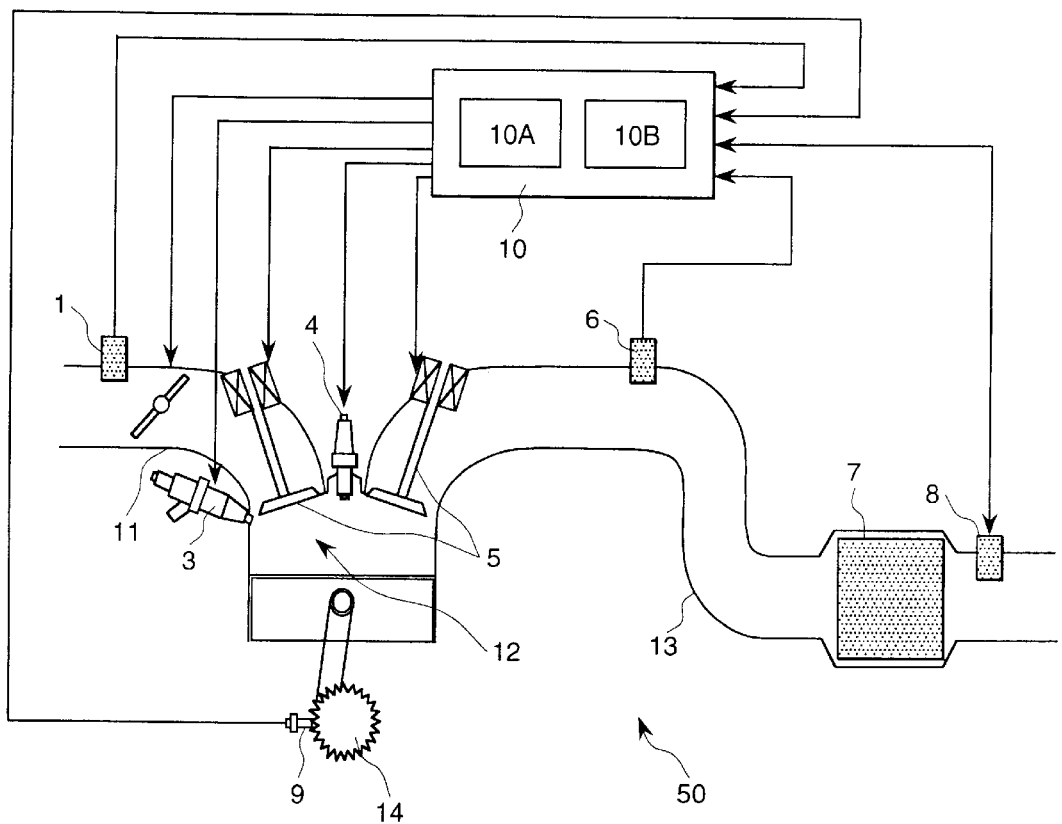
FIG. 3 is a system configuration view when a control system for a compression ignition engine according to an embodiment of the present invention is applied to a cylinder-injection-of-fuel engine.

Hereafter, the embodiment of the present invention is explained referring to the drawing. FIG. 3 shows the embodiment of the present invention, in which is illustrated a system construction applied the preferred embodiment of a control system for a compression ignition engine.

An engine 50 is a compression ignition engine which compresses a premixed air/fuel mixture for self-ignition. An air-flow sensor 1 measuring an intake air flow rate and a throttle valve 2 adjusting intake air flow rate are provided at appropriate positions within an air induction passage 11, respectively. Also, injectors 3 for injecting fuel into the air induction passage or combustion chambers, spark ignition plugs 4 supplying ignition energy and variable valves 5 controlling EGR amount to be recirculated into the combustion chambers, respectively, are provided for respective engine cylinders 12. A three-way catalytic converter 7 for purifying an exhaust gas, an air/fuel ratio sensor 6, such as $O_2$ sensor as one embodiment of an air/fuel ratio detector, for detecting an air/fuel ratio from the exhaust gas at upstream side of the catalytic converter 7, an $NO_x$ sensor 8 detecting $NO_x$ concentration at downstream side of the catalytic converter 7 are provided in an exhaust passage. Furthermore, on a crankshaft 14, a crank angle sensor 9 for detecting or deriving a crank shaft angular position is provided. Signals from the air flow sensor 1, the air/fuel ratio sensor 6, the $NO_x$ sensor 8 and the crank angle sensor 9 are input to an engine control unit (hereinafter referred to as ECU) 10, in which a microcomputer is provided for signal processing. ECU 10 includes an exhaust control unit 10A performing various control on the basis of an output signal of the $NO_x$ sensor 8 for preventing deterioration of exhaust gas purification performance, which will be discussed later, and a diagnosis unit 10B. As will be discussed later, the exhaust control unit 10A prevents deterioration in exhaust gas purification performance at the transition in combustion modes between spark ignition and compression ignition, during combustion in spark ignition and during combustion in compression ignition. On the other hand, the diagnosis unit 10B prevents deterioration of exhaust gas purification performance through diagnosis of fatigue of $NO_x$ sensor 8 and the catalytic converter 7.

FIG. 4 illustrates relationship between a pressure within the combustion chamber, a fuel injection signal and a spark ignition timing in spark ignition mode operation under control by ECU 10.

As shown, in normal spark ignition mode operation, the fuel is injected through the fuel injector 3 in an induction stroke, and the fuel in the combustion chamber is ignited by the spark plug 4 in a compression stroke.

On the other hand, FIG. 5 illustrates a pressure within the combustion chamber, a fuel injection signal and so forth in compression ignition mode operation under control by ECU 10.

Here, there are some methods in realizing the compression ignition mode operation. In the shown embodiment, as illustrated in FIG. 5, profiles of an intake valve 5 and an exhaust valve 5 are varied to enclose the exhaust gas (internal EGR) in exhaust stroke. Then, into the exhaust gas enclosed within the combustion chamber, an auxiliary fuel is injected by the fuel injector 3 for compression to generate a radical. Next, in the compression stroke, a primary fuel is injected through the fuel injector 3 to cause self-ignition in the fuel. Namely, ECU 10 controls internal temperature within the cylinder 12 by internal EGR and can also control an ignition temperature by the auxiliary fuel injection and the primary fuel injection for appropriately controlling compression ignition timing.

Figure 6A:
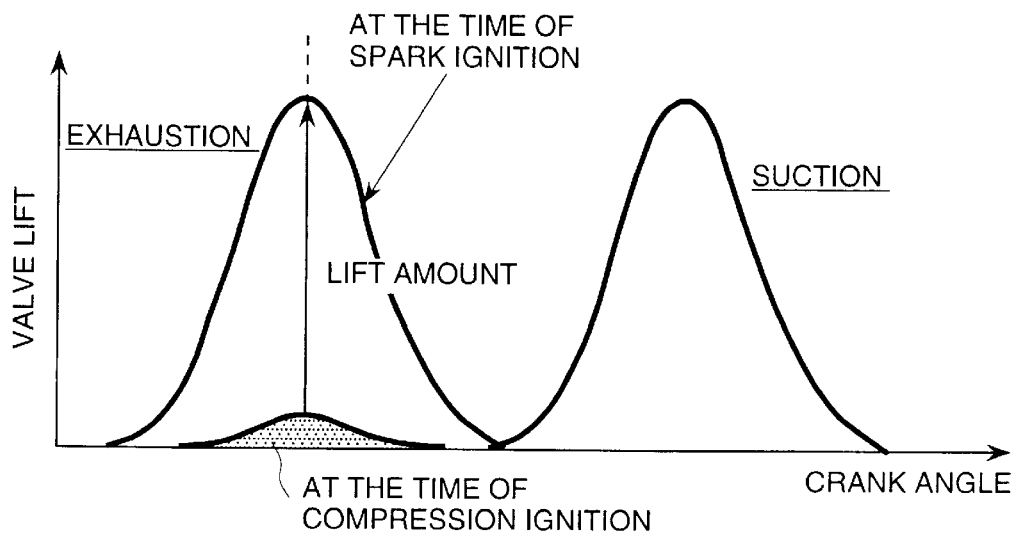
FIG. 6 is a view showing exhaust valve profiles at the time of the spark ignition and compression ignition operations due to the use of the engine control device of FIG. 3.
Figure 6B:
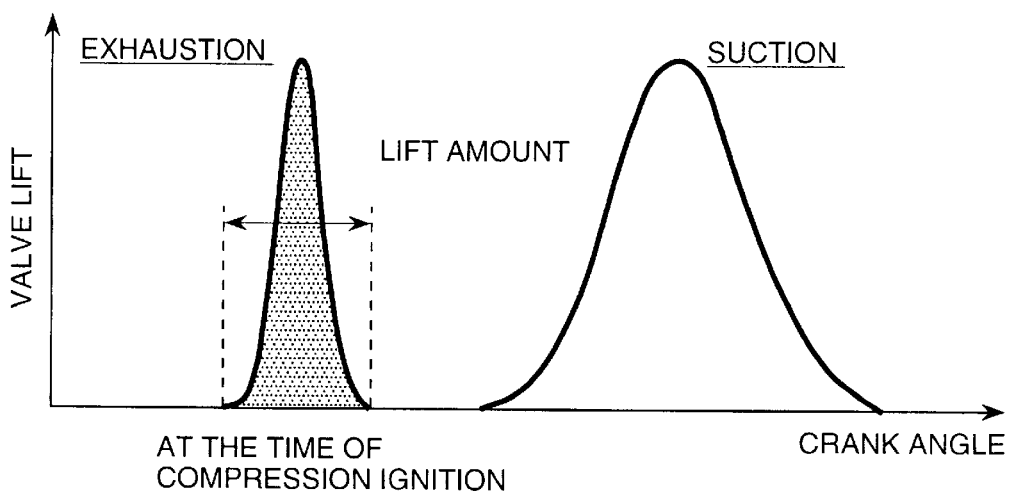

FIGS. 6(*a*) and 6(*b*) show profiles of the intake and exhaust valves 5 for controlling the internal EGR. FIG. 6(*a*) shows a method for increasing the internal EGR by enclosing the exhaust gas by reducing a magnitude of valve lift of the intake and exhaust valves 5 during compression ignition mode operation. On the other hand, FIG. 6(*b*) shows a method for increasing the internal EGR by enclosing the exhaust gas by setting the lifting period of the exhaust valve 5 shorter than the lifting period of the intake valve during the compression ignition mode operation.

Figure 1:
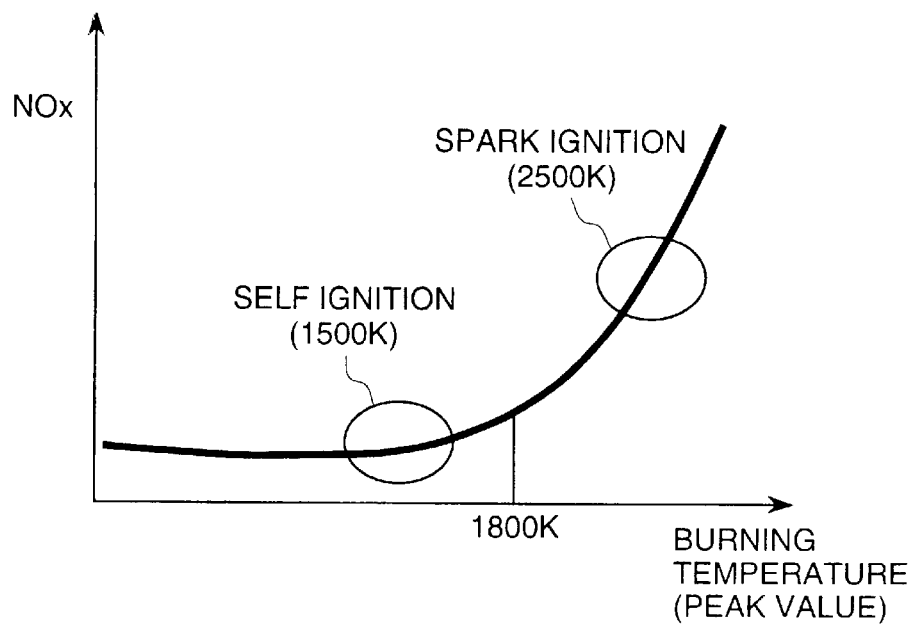
FIG. 1 is a view showing the relationship between combustion temperature and the amount of $NO_x$ exhaust in spark ignition operation and compression ignition operation.

As shown in FIG. 1, during compression ignition mode operation, little amount of $NO_x$ is generated. Furthermore, since generation of $NO_x$ has little dependency on air/fuel ratio, exhaust gas purification performance will not deteriorate even in lean air/fuel mixture condition during compression ignition mode operation. Namely, the shown embodiment of the engine 50 is designed for reducing exhaust gas to be discharged to the atmosphere by controlling air/fuel ratio toward stoichometric value during spark ignition mode operation, and for reducing exhaust gas to be discharge to the atmosphere by controlling air/fuel ratio toward stoichiometric value or lean during compression ignition mode operation.

Here, discussion will be given for air/fuel ratio control during spark ignition mode operation on the basis of a detection value of $NO_x$ of the $NO_x$ sensor 8 located downstream side of the catalytic converter 7.

Figure 7:
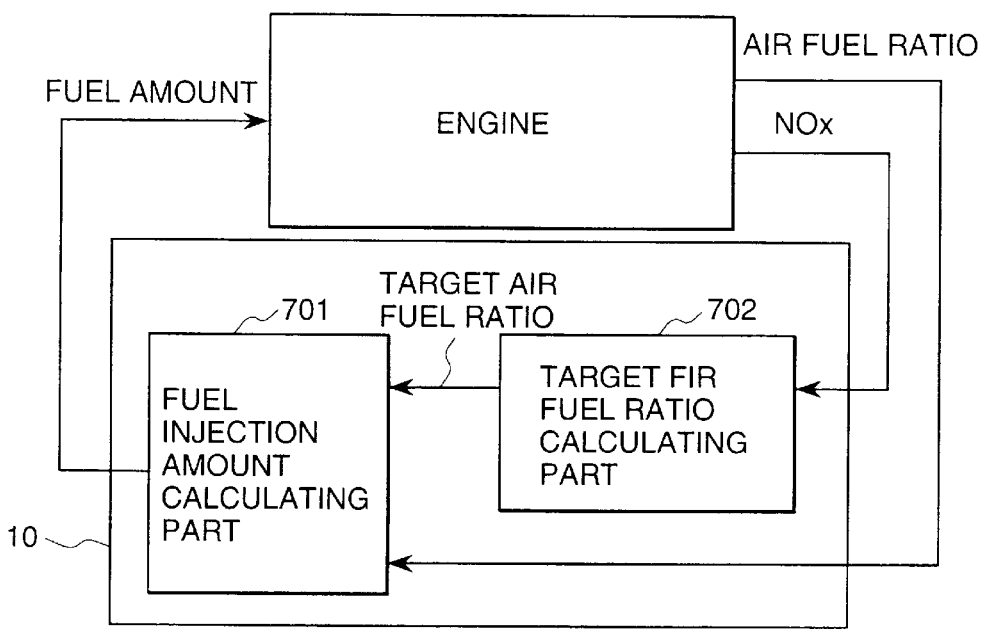
FIG. 7 is a block diagram of air/fuel ratio control based on an air/fuel ratio and an $NO_x$ detection value due to the use of the engine control device of FIG. 3.

FIG. 7 is a control block diagram of an air/fuel ratio control system by the exhaust control unit 10A in ECU 10.

ECU 10 includes a fuel injection calculating portion 701 and a target air/fuel ratio calculating portion 702. In order to permits the exhaust control unit 10A to purify the exhaust gas at high efficiency by the catalytic converter 7, it becomes necessary to appropriately control an oxygen storage amount in the catalytic converter 7. Therefore, the target air/fuel ratio calculating portion 702 derives a target air/fuel ratio for optimizing purification efficiency in the catalytic converter 7 on the basis of the detection value of $NO_x$ from the $NO_x$ sensor 8 to output to the fuel injection calculating portion 701 as one embodiment of the air/fuel ratio control means. The fuel injection calculating portion 701 derives a fuel amount to control an actual fuel injection amount detected by the air/fuel ratio sensor 6 toward the target air/fuel ratio to output to the fuel injector 3, and thus controls oxygen storage amount in the catalytic converter 7.

Figure 8:
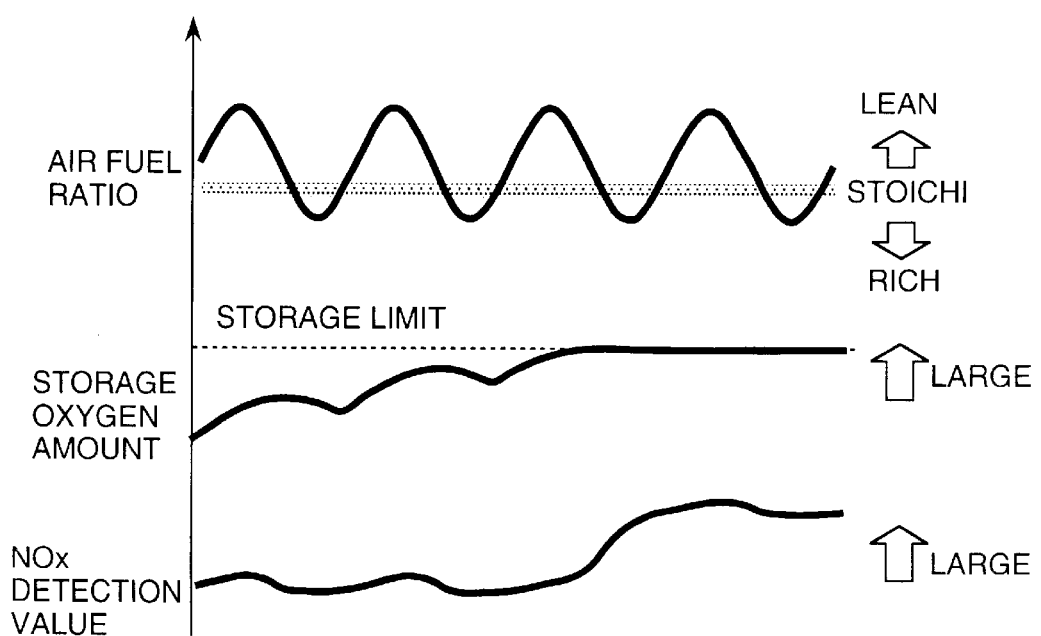
FIG. 8 shows a chart an air/fuel ratio and an $NO_x$ detection value at the time of the spark ignition operation due to the use of the engine control device of FIG. 3.
Figure 9:
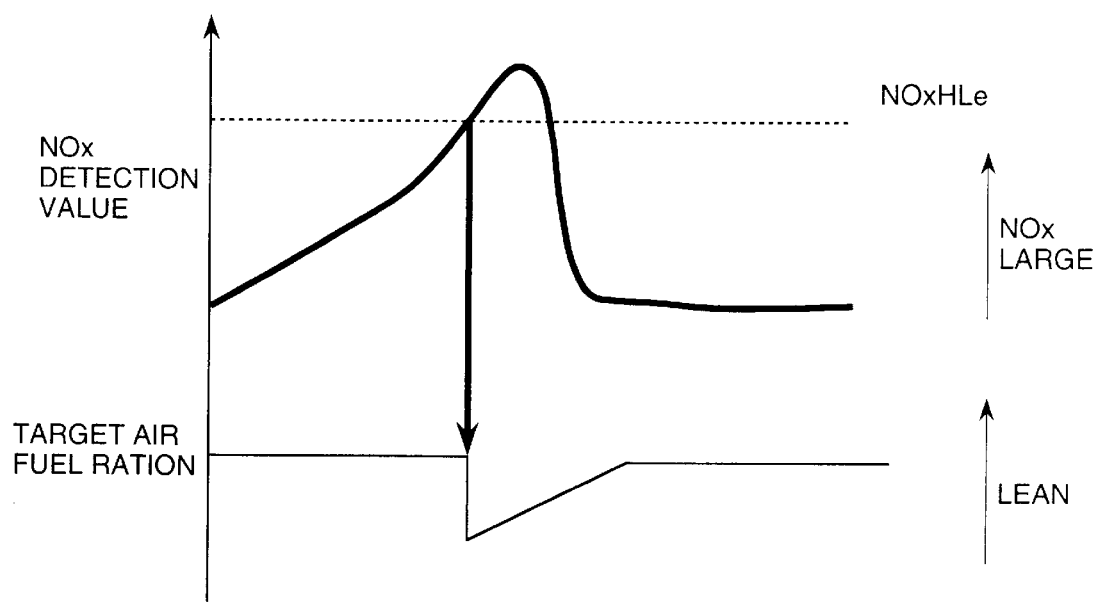
FIG. 9 is a view to showing an example of an output from a target air/fuel ratio calculating part in FIG. 7.

Here, FIG. 8 shows oxygen storage amount and $NO_x$ detection amount when the detected value of the air/fuel ratio sensor 6 indicates lean mixture condition. As shown, when the air/fuel ratio is lean and if the oxygen storage amount reaches a storage limit, purification of $NO_x$ by the catalytic converter becomes impossible. Therefore, detection value of $NO_x$ is increased.

As a solution for this, when the detected value of the $NO_x$ sensor 8 exceeds a predetermined value $NO_xHLe$, the exhaust control unit 10A varies the target air/fuel ratio for feedback control of air/fuel ratio (λ-control) toward rich side temporarily, and subsequently returns the target air/fuel ratio to the normal target air/fuel ratio for controlling the oxygen storage amount. It should be noted that some $NO_x$ sensors have capability of measurement of oxygen concentration simultaneously with $NO_x$ amount. In such case, feedback control of the air/fuel ratio is performed by setting the target air/fuel ratio so that oxygen concentration on downstream side of the catalytic converter becomes constant. If $NO_x$ is detected, the target value of the oxygen concentration is shifted toward rich side until the detection value of $NO_x$ sensor 8 becomes zero. Even in this manner, the oxygen storage amount can be controlled appropriately.

On the other hand, ECU 10 corrects fuel injection amount to control the air/fuel ratio toward the target air/fuel ratio. However, when abnormality of the air/fuel sensor 6 is judged or detected, it becomes not possible to perform control the air/fuel ratio toward the target air/fuel ratio. Therefore, the exhaust control unit 10A reduces the exhaust gas on the basis of the $NO_x$ sensor 8 in the following manner when abnormality of the air/fuel sensor 6 is detected.

Figure 10:
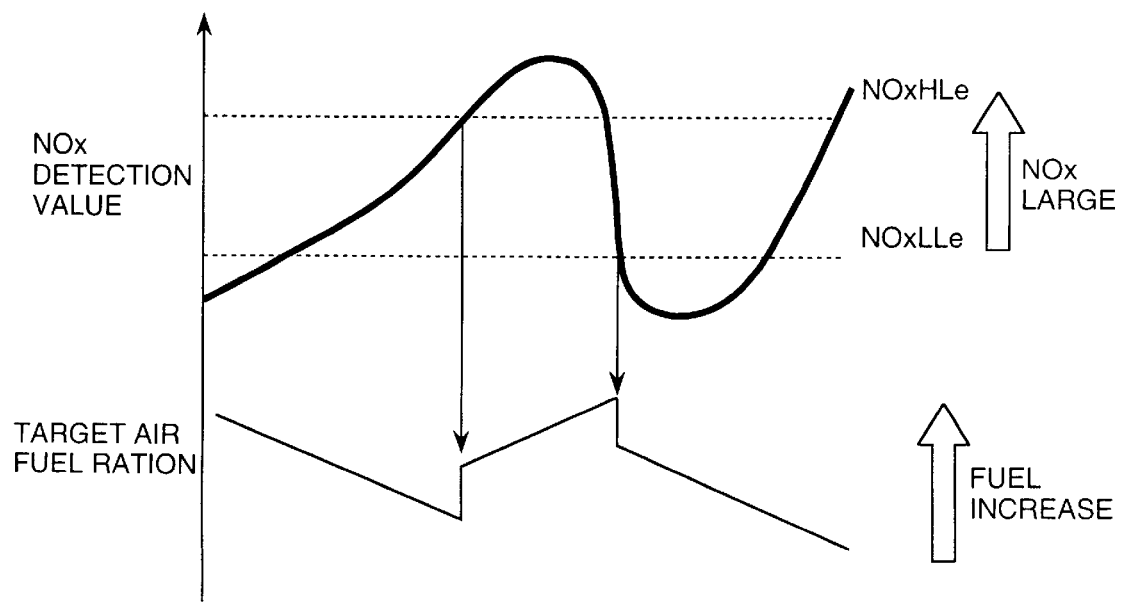
FIG. 10 is a view showing an example of calculation for the amount of correction in a fuel injection amount calculating part in FIG. 7 at the time of the break-down of an air/fuel ratio sensor.

FIG. 10 shows a relationship between the $NO_x$ detection value and the fuel correction amount by the exhaust control unit 10A of ECU 10 upon failure of the air/fuel sensor.

The exhaust control unit 10A includes an air/fuel ratio sensor diagnosing means for detecting abnormality of the air/fuel ratio sensor 6. As shown, upon diagnosis of abnormality of the air/fuel ratio sensor 6, the fuel injection amount is corrected on the basis of the output signal of the $NO_x$ sensor 8. Namely, when the detection value of $NO_x$ is less than or equal to the predetermined value $NO_xHLe$, fuel correction amount is reduced by a given rate. On the other hand, when the $NO_x$ detection value exceeds the predetermined value $NO_xHLe$, fuel correction is performed by a given amount toward rich side, and subsequently, the fuel correction amount is increased at a given rate. By this, while the air/fuel ratio becomes slightly lean, excessive offset of the air/fuel ratio may not be caused to prevent deterioration of exhaust gas purification performance.

Next, discussion will be given for exhaust control upon transition in combustion mode between the spark ignition and compression ignition by the exhaust control unit 10A of ECU 10.

Figure 11:
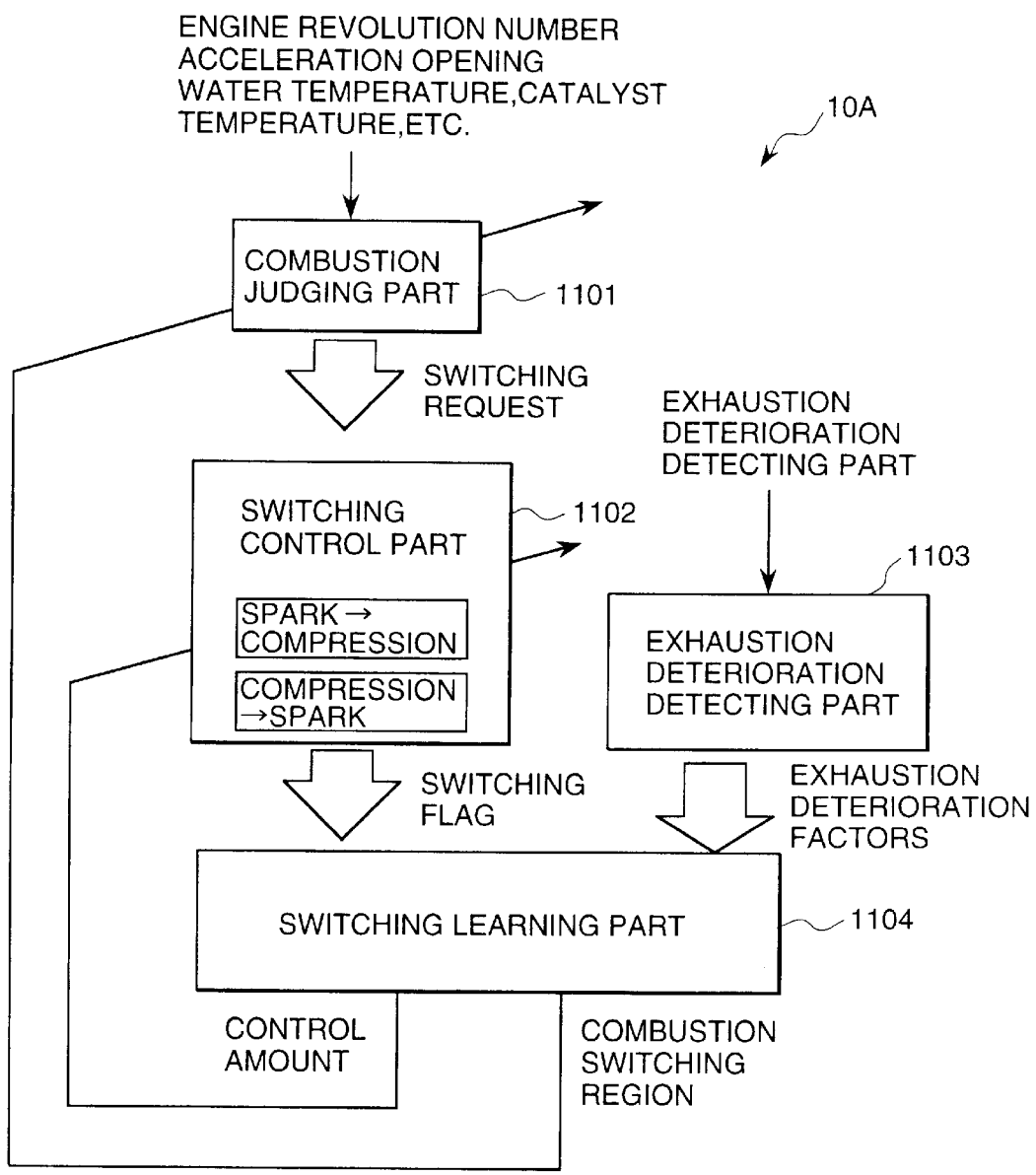
FIG. 11 is a control block view a switching control portion by an exhaust controller in FIG. 3.

FIG. 11 is a block diagram showing a control system for preventing deterioration of the exhaust gas purification performance upon switching of combustion mode by the exhaust control unit 10A.

The exhaust control unit 10A includes a combustion judgment portion 1101, a switching control portion 1102, an exhaust deterioration detecting portion 1103 and a switching learning portion 1104.

Figure 2:
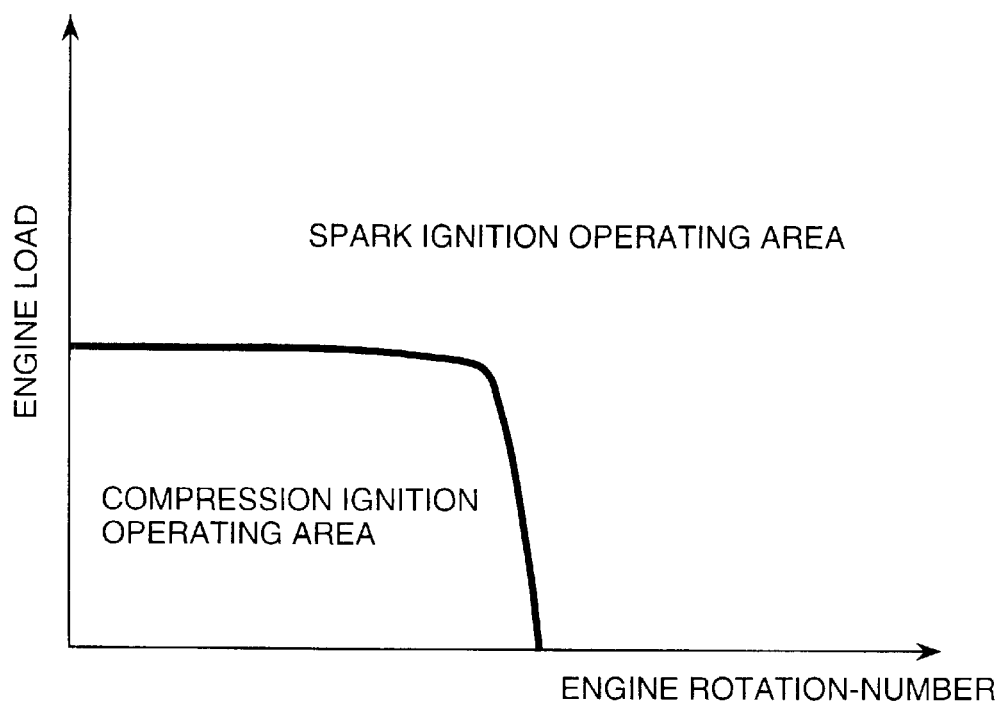
FIG. 2 is a view showing a spark ignition operation area and a compression ignition operation aria or an area which can be switched.

The combustion judgment portion 1101 reads out an engine revolution speed or engine speed, an engine load, such as air intake flow rate, an accelerator depression magnitude, an engine coolant temperature, a catalyst temperature and so on and makes judgment whether switching of the combustion mode is to be performed or not for outputting a switching demand to the switching control portion 1102 on the basis of the result of judgment. For example, as shown in FIG. 2, the combustion judgment portion 1101 is set a map defining a range, in which compression ignition is possible, in relation to the engine revolution speed and the engine load. The range capable of combustion ignition will be hereinafter referred to as "combustion ignition range". The combustion judgment portion 1101 derives a target engine load on the basis of the accelerator depression amount. When the instantaneous engine speed and the target engine load falls within the compression ignition range, the combustion judgment portion 1101 makes judgment whether switching from the spark ignition mode to compression ignition mode is to be performed or not. It should be noted that, in order to prevent deterioration in exhaust gas purification performance, switching of the combustion mode from the spark ignition mode to the compression ignition mode is inhibited when the coolant temperature or the catalyst temperature does not reach a predetermined criterion value even when the engine revolution speed and the engine load falls within the compression ignition range.

The switching control portion 1102 switches the combustion mode from the spark ignition mode to the compression ignition mode or from the compression ignition mode to the spark ignition mode in accordance with the switching demand, and outputs to the switching learning portion 1104.

As will be discussed later, the exhaust deterioration detecting portion 1103 is means for predicting an exhaust deterioration factor on the basis of the detection value of the $NO_x$ sensor 8 upon switching. The result of prediction is output to the switching learning portion 1104.

As will be discussed later, the switching learning portion 1104 learns control amounts (e.g. spark ignition timing, a throttle control amount, a fuel injection amount, a fuel cut period before switching to the compression ignition, a target air intake amount or a target EGR amount and soon) of the switching control portion 1102. In the alternative, by leaning control objects (e.g. combustion mode switching region for switching between the spark ignition mode combustion and the compression ignition mode combustion as judged by the combustion judgment portion 1101), deterioration of the exhaust gas purification performance can be prevented upon combustion mode switching transition.

By the foregoing control, even when offset is caused in the internal EGR amount due to secular change or other reason, the intake air flow rate is adjusted to ensure avoidance of rich mixture in relation to the internal EGR amount by learning. Also, since the internal EGR amount can be controlled for enabling switching to the compression ignition mode combustion, deterioration of exhaust gas purification performance can be successfully prevented.

Figure 12:
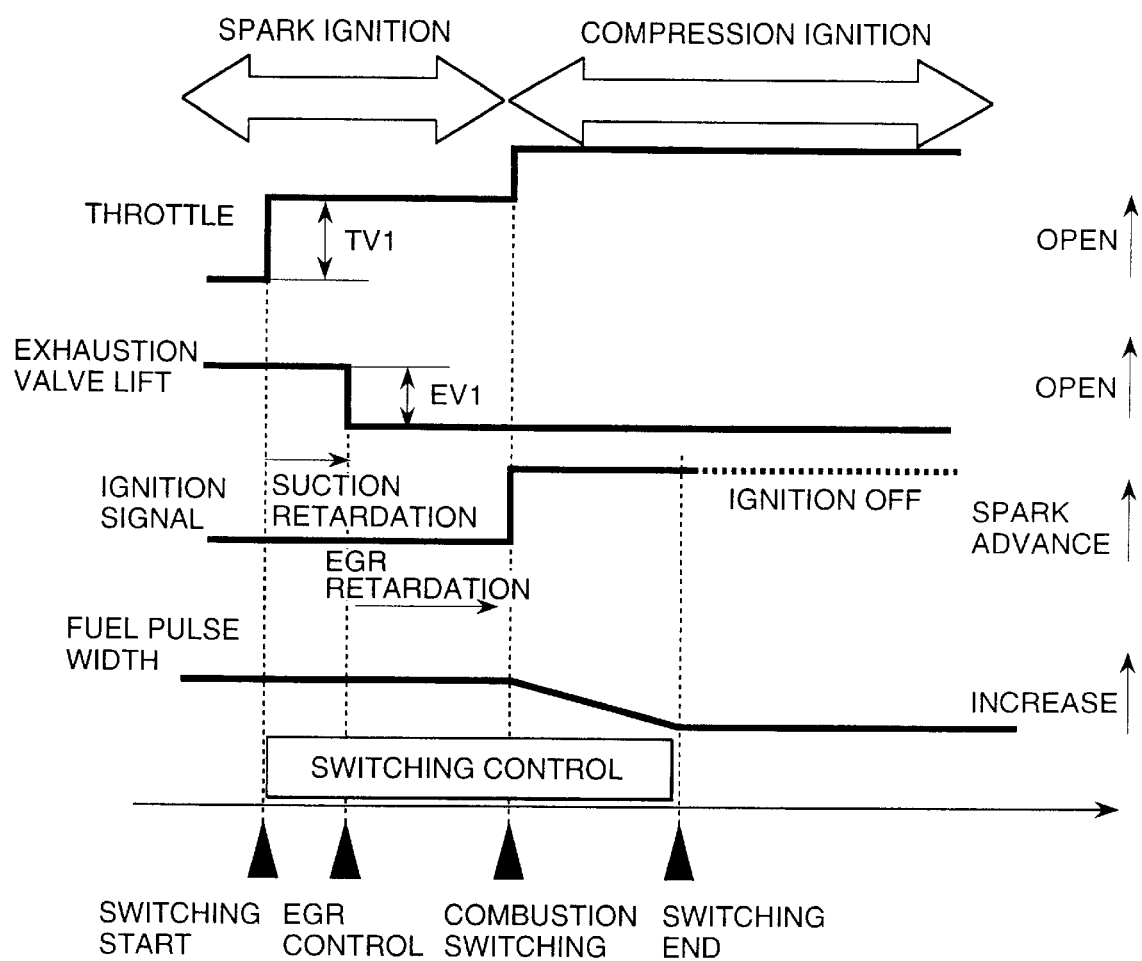
FIG. 12 is a view showing control signal 1 at the time of the combustion switching control in FIG. 11 (to the compression ignition from the spark ignition)

FIG. 12 shows one example of switching control in combustion mode switching transition from the spark ignition mode combustion to the compression ignition mode combustion by the switching control portion 1102 of the exhaust control unit 10A, which is switching control in steady state (output being constant).

Respective target values of an operation magnitude of the throttle valve, a lifting magnitude of the exhaust gas 5, a timing of a spark signal of the spark plug 4 and a fuel injection pulse width of the fuel injector 3 are shown in time sequence (toward upward in the drawing, increasing of open angle of the throttle valve, increasing of lifting magnitude, advancing of spark ignition timing, increasing of the fuel injection pulse width).

At first, a relationship between the internal EGR amount and the exhaust valve lifting magnitude EV1 or a lifting period of the exhaust valve 5 is variable depending upon operating condition, such as the engine revolution speed, the engine load and so forth. Through experiments or simulation, relationship between the internal EGR amount and the exhaust valve lifting magnitude EV1 or the lifting period per operating condition has to be preliminarily derived and set in a form of map or model.

Here, when the internal EGR amount is increased by reducing valve lifting magnitude of the exhaust valve 5, amount of fresh air flowing into the engine cylinder 12 is decreased to possibly make the air/fuel ratio rich. Such excessively rich air/fuel ratio may cause deterioration of exhaust gas purification performance by lowering of oxidation function in the catalytic converter 7. Therefore, the exhaust control unit 10A prevents formation of rich air/fuel mixture by preliminarily opening the throttle valve 2 depending upon the internal EGR amount.

For this purpose, since the intake air flow rate comparable with the internal EGR amount is required to flow into the combustion chamber, the throttle valve 2 is driven to increase open angle by TV1. Since the internal EGR amount is variable per engine driving range or operation range. The throttle opening magnitude TV1 is preliminarily derived by experiments or simulation so that the air/fuel ratio is may not become rich as a feed-forward control amount read out from the map per operation range.

After delay in adjustment of the intake air flow rate depending upon the intake air flow rate, the engine cylinder 12 in expansion stroke is detected to shift the valve lifting magnitude of the exhaust valve 5 to the predetermined value before entering into the exhaust stroke to control the internal EGR to establish a condition permitting compression ignition mode combustion. Subsequently, the spark ignition timing of the relevant cylinder in compression ignition is retarded from a timing of self-ignition of the pre-mixture to switch the combustion mode from the spark ignition mode to the compression ignition.

Next, when the combustion mode is switched to the compression ignition the target value of the air/fuel ratio is set to lean. More particularly, the throttle valve 2 is further opened to increase the intake air flow rate, and the fuel injection amount is reduced anticipating improvement of pumping loss component and improvement of combustion efficiency. At this time, it is desirable to develop a maximum torque by controlling compression ignition timing.

Figure 13:
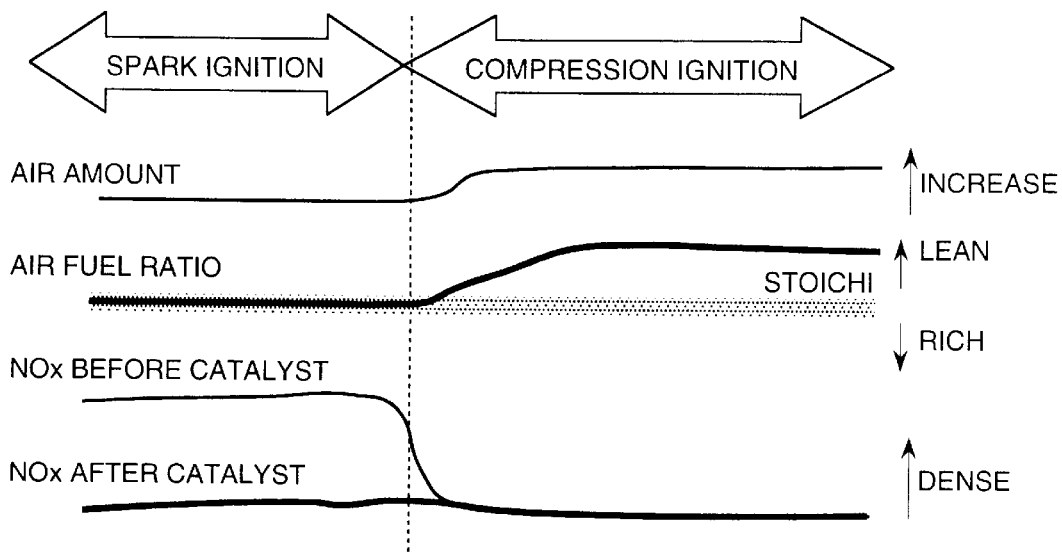
FIG. 13 shows outputs 1 from various sensors at the time of the normal condition in FIG. 12.

FIG. 13 shows the intake air flow rate, the air/fuel ratio in the exhaust gas discharged from the engine, $NO_x$ concentration upstream and downstream of the catalytic converter 7 in time sequence when the shown embodiment of control is executed by the exhaust control unit 10A (in the drawings, toward upward in the drawing, increasing of the intake air flow rate, lean of air/fuel ratio and increasing of $NO_x$ concentration are indicated).

Under the shown embodiment of the control by the exhaust control unit 1A, the intake air flow rate becomes constant during spark ignition mode combustion. After switching to the compression ignition mode combustion, the throttle valve 2 is opened to increase the intake air flow rate. On the other hand, the air/fuel ratio detected by the air/flow rate sensor 6 becomes stoichiometric value during the spark ignition mode operation and lean during the compression ignition mode operation. Furthermore, $NO_x$ amount upstream of the catalytic converter 7 is reduced upon switching transition from the spark ignition mode to the compression ignition mode and thus is lowered to the same level as that during compression ignition mode operation after switching transition to the compression ignition mode. Therefore, $NO_x$ amount downstream of the catalytic converter 7 can be maintained at the equal level before and after switching transition.

As set forth above, the exhaust control by the exhaust control unit 10A is performed by opening the throttle valve 2 in the magnitude of TV1 in order to preventing the air/fuel ratio in the engine cylinder 12 from becoming rich. On the other hand, in order to control the internal EGR amount for switching to the compression ignition, the lifting magnitude of the exhaust valve 5 is reduced in the magnitude of EV1. These control amounts are adjusted upon shipping. It is thus possible that the control amounts become inappropriate due to secular change or other reason.

Figure 14:
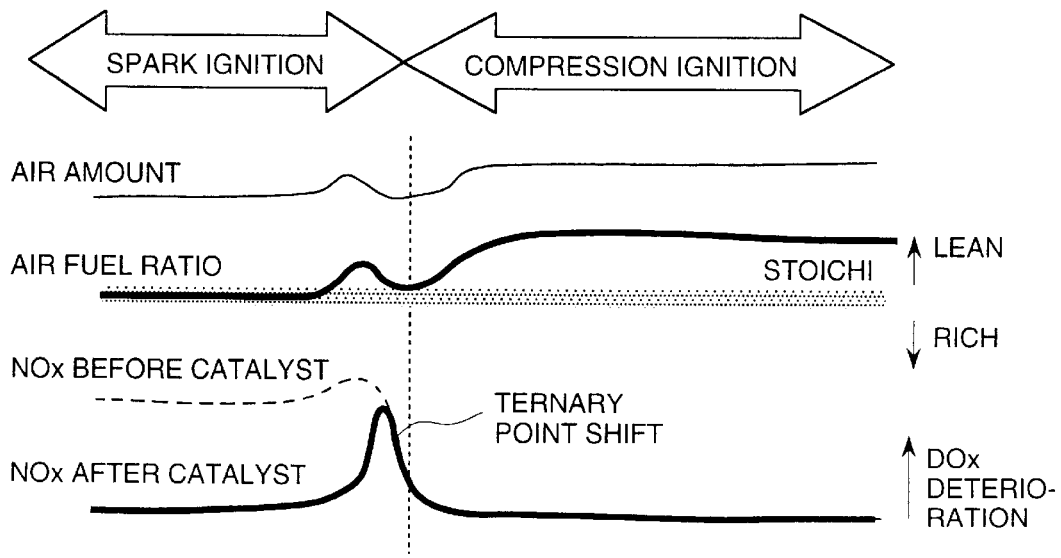
FIG. 14 shows output 2 from various sensors at the time of the abnormal condition due to air amount control error in FIG. 12.
Figure 15:
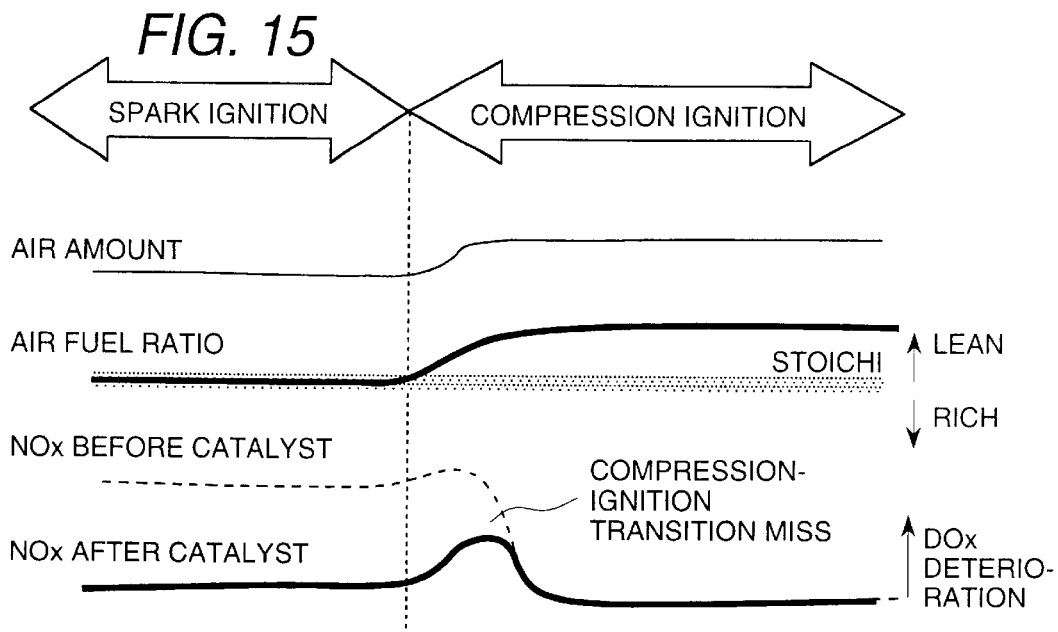
FIG. 15 shows output 3 from various sensors at the time of the abnormal condition due to EGR control error in FIG. 12

For example, as shown in FIG. 14, if an actual intake air flow rate flowing into the engine cylinder 12 at the throttle valve open angle TV1 is large, the air/fuel ratio becomes leaner in the extent corresponding to increasing of the intake air flow rate. As a result, it becomes possible to temporarily cause the catalytic converter 7 impossible to purify $NO_x$ generated during spark ignition mode combustion to impulsively discharge increased amount $NO_x$. On the other hand, as shown in FIG. 15, if internal EGR amount is not appropriate at switching transition, delay can be caused in switching timing from the compression ignition mode to the spark ignition mode to impulsively discharge increased amount of $NO_x$ in transition of the air/fuel ratio to be lean. Such impulsive increase of $NO_x$ discharge amount will be hereinafter occasionally referred to as "$NO_x$ spike".

Therefore, the exhaust control unit 10A is provided with the exhaust deterioration detecting portion 1103 as shown in FIG. 11. In the exhaust deterioration detecting portion 1103, the exhaust deterioration factor is analyzed by detecting $NO_x$ at switching transition to output result of analysis to the switching learning portion 1104.

More particularly, the exhaust deterioration detecting portion 1103 makes judgment whether discharging of $NO_x$ is caused due to offset in the intake air flow rate control or offset in the EGR control on the basis of the relationship between timing of occurrence of the $NO_x$ spike, combustion mode switching timing and output of the air/fuel ratio sensor upstream of the catalytic converter. Then, in the switching learning portion 1104, feed-forward control is performed so that when the $NO_x$ spike is detected before switching of combustion mode, the throttle valve open angle TV1 is reduced depending upon magnitude of the $NO_x$ spike. On the other hand, when the $NO_x$ spike is detected after switching of the combustion mode, the lifting magnitude EV1 of the exhaust valve 5 is increase depending upon magnitude of the $NO_x$ spike.

On the other hand, the switching learning portion 1104 makes judgment the switching of the combustion mode is not possible when the value after learning exceeds a predetermined control range to update a combustion mode switching range map provided in the combustion judgment portion 1101 to inhibit switching. It should be noted that the combustion mode switching range map may be the same map as shown in FIG. 2, or, in the alternative, may be other map in a sense that can implement combustion mode switching control without causing deterioration of exhaust purification performance.

Figure 16:
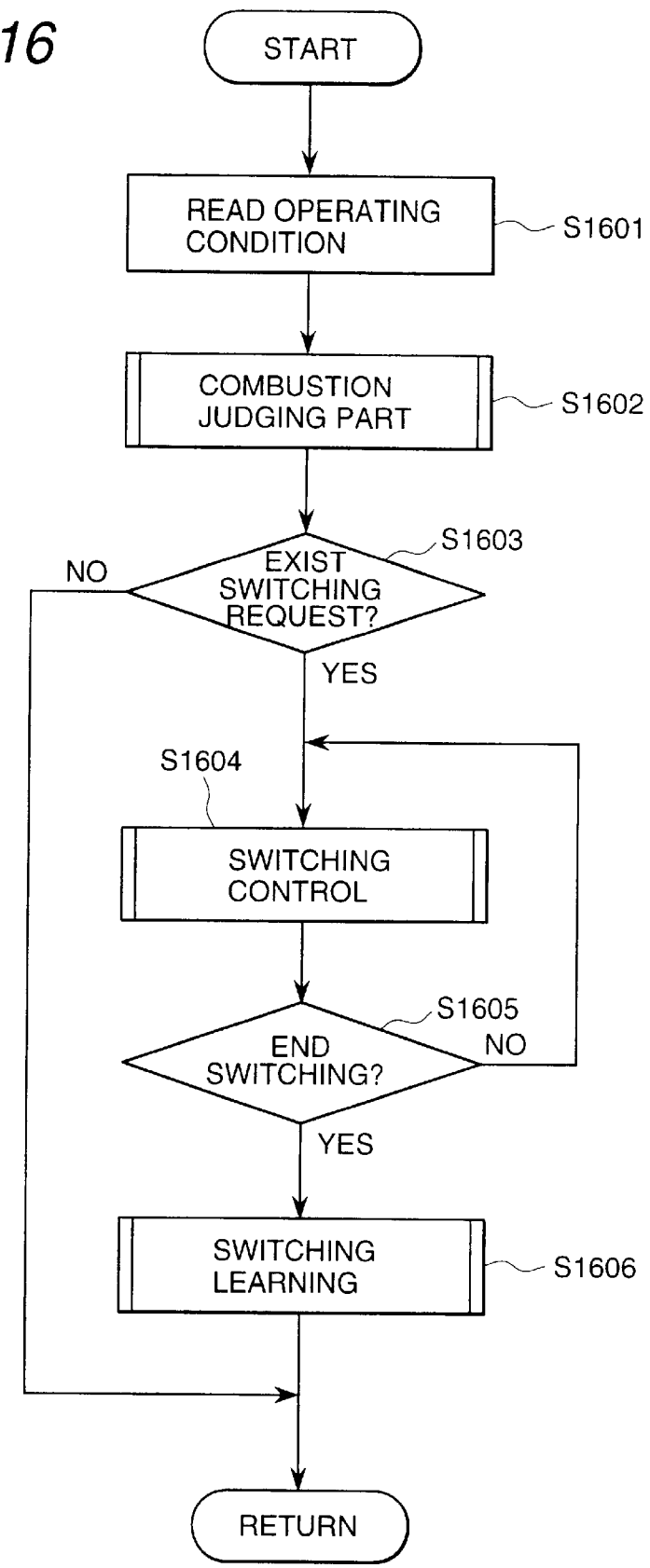
FIG. 16 is an operation flow chart of exhaust control in FIG. 11.

FIGS. 16 to 19 are flowcharts showing operation of the exhaust control by the exhaust control unit 10A. FIG. 16 illustrates the control block of FIG. 11 in a form of flowchart.

At step 1601, operating condition (the engine revolution speed, the accelerator depression magnitude, the coolant temperature, the catalyst temperature and so forth) is read out from various sensors. At step 1602, judgment is made whether the combustion mode is to be switched or not in the combustion judgment portion 1101. Then, process is advanced to step 1603.

At step 1603, judgment is made whether combustion mode switching demand is present or not. If the combustion mode switching demand is present, namely the answer is YES at step 1603, the process is advanced to step 1604. Then, combustion mode is switched at the switching control portion 1102. The process is then advanced to step 1605. It should be noted that when the combustion mode switching demand is not present as checked at step 1603, a sequence of operation is terminated.

At step 1605, judgment is made whether the switching of the combustion mode is completed or not. The process is not advanced to step 1606 until combustion mode switching control is completed. When switching is completed, namely answer is YES at step 1605, the process is advanced to step 1606 to learn the control amount of the switching control portion 1102 or the combustion mode switching range in the combustion judgment portion 1101 on the basis of the detection value of the $NO_x$ sensor 8, and then to terminate the sequence of operation.

Next, discussion will be given for operation in respective of the combustion judgment portion 1101 at step 1602, switching control portion 1102 at step 1604 and the switching learning portion 1104 at step 1606 with reference to the flowchart.

Figure 17:
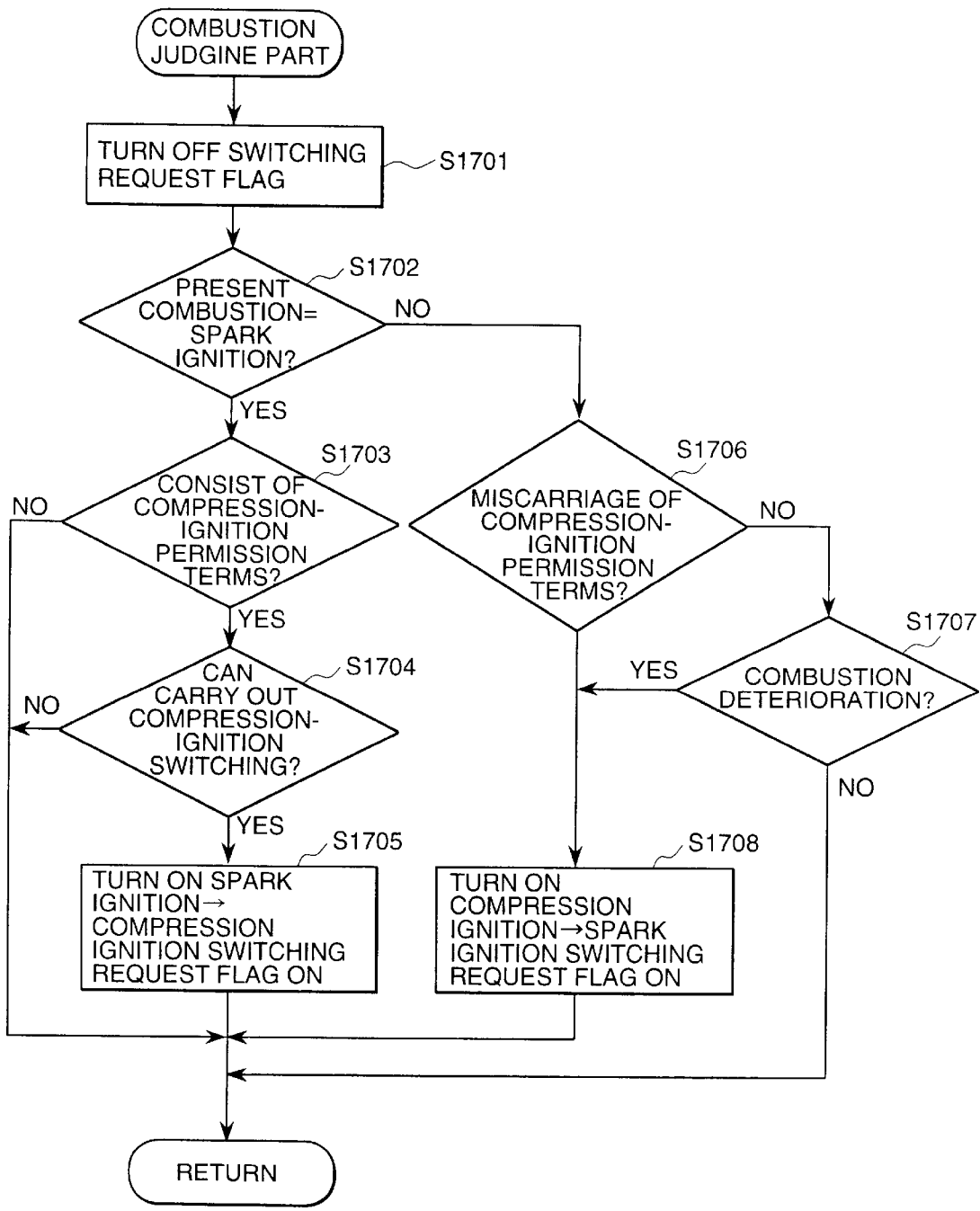
FIG. 17 is an operation flowchart of a combustion judgment part in FIG. 11.

FIG. 17 is a flowchart showing the operation of the combustion judgment portion 1101 of the exhaust control unit 10A.

At step 1701, a switching demand flag is cleared. At step 1702, judgment is made whether the current combustion mode is the spark ignition mode or not. If the current combustion mode is the spark ignition mode, namely the answer is YES, the process is advanced to step 1703. If the current combustion mode is not the spark ignition mode (compression ignition mode), the process is advanced to step 1706.

At steps 1703 and 1704, check is performed whether switching from the spark ignition mode to the compression ignition mode is possible or not. More particularly, at step 1703, check is performed whether a stable compression ignition mode combustion control is possible or not by checking if the engine revolution speed is lower than or equal to a predetermined value, if the intake air flow rate is smaller than or equal to a predetermined value, if a variation amount of the accelerator depression magnitude falls within a predetermined range, if fluctuation of the engine revolution speed is smaller than or equal to a predetermined value and other conditions. If switching of the control mode is possible, the process is advanced to step 1704. At step 1704, check is performed whether the engine operating condition falls within the operation range permitting switching from the spark ignition mode to the compression ignition mode. Here, the range where deterioration of exhaust gas purification performance is not caused at switching transition from the spark ignition mode to the compression ignition mode, is defined in a form of a map with respect to the engine revolution speed and an engine output torque, for example, and the current operation range is checked if falls within the thus defined range. When the current operation range falls within the range not causing deterioration of exhaust gas purification performance, namely answer is YES, the process is advanced to step 1705. If stable compression ignition mode combustion control is not possible as checked at step 1703, or, in the alternative, the current operation range does not fall within the range not causing deterioration of exhaust gas purification performance, the sequence of operation is terminated.

At step 1705, a switching demand flag indicative of the switching demand from the spark ignition mode to the compression ignition mode is set ON. Then, the sequence of operation is terminated.

On the other hand, at step 1702, when the current combustion mode is the compression ignition mode, the process is advanced to step 1706 to check whether a compression ignition permitting condition is not satisfied or not. If the compression ignition permitting condition is not satisfied, the process is advanced to step 1708. On the other hand, if the compression ignition permitting condition is satisfied, the process is advanced to step 1707 to check whether deterioration of combustion is caused or not. At this step, checking of misfiring is performed on the basis of the signal of the crank angle sensor 9 or other, and checking of abnormal combustion is performed on the basis of the signal of the $NO_x$ sensor 8. When deterioration of combustion is detected, namely the answer is YES as checked at step 1707, the process is advanced to step 1708 to set ON the switching demand flag for switching from the compression ignition to the spark ignition. Then, a sequence of operation is terminated. It should be noted that when deterioration of combustion is not detected, a sequence of operation is terminated.

Accordingly, the combustion judgment portion 1101 of the exhaust control unit 10A issues the switching demand only in a range where switching can be performed without causing deterioration of the exhaust gas purification performance in addition to judgment whether compression ignition mode combustion is possible. Thus, deterioration of the exhaust gas purification performance during switching transition of the combustion mode can be successfully prevented.

On the other hand, during the compression ignition mode operation, deterioration of combustion is monitored so that the combustion mode is quickly returned to the spark ignition mode upon detection of deterioration of combustion. Therefore, deterioration of the exhaust gas purification performance can be prevented even during compression ignition mode operation. Furthermore, by using the output of the $NO_x$ sensor 8 in judgment of deterioration of combustion, a little deterioration of exhaust gas purification performance which cannot be perceived from increasing of $NO_x$ discharge amount due to non-uniformity of the mixture, fluctuation of engine revolution speed or other parameter, can be detected.

Figure 18:
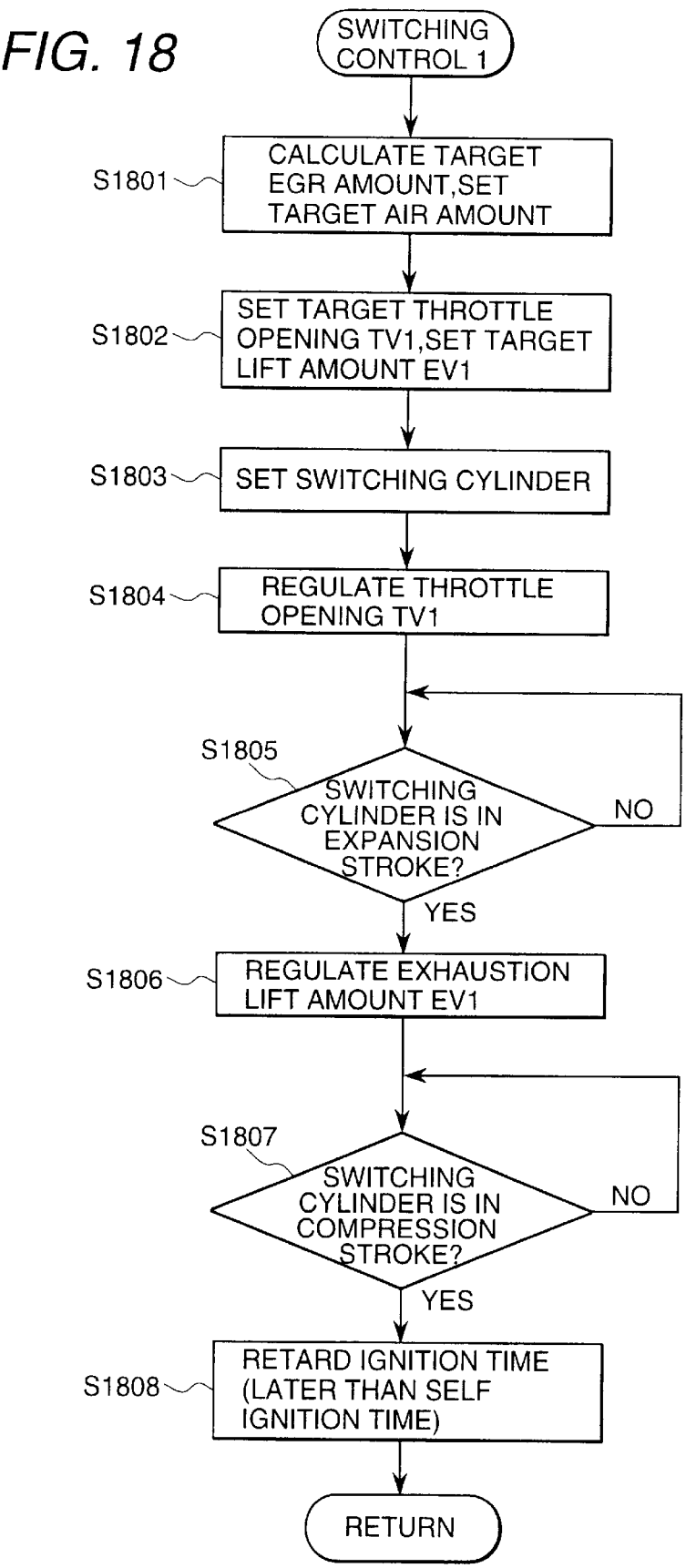
FIG. 18 is an operation flowchart of a combustion switching control part in FIG. 11.

FIG. 18 is a operational flowchart of one embodiment upon switching from the spark ignition mode to the compression ignition in the switching control portion 1102 of the exhaust control unit 10A.

At step 1801, the target EGR amount is calculated for switching to the compression ignition mode combustion. The target intake air flow rate is set for preventing the mixture in the combustion chamber rich depending upon the target EGR amount. Then, at step 1802, in order to realize the target EGR amount and the target intake air flow rate, the target throttle open angle TV1 for the throttle valve 2 and the target lifting magnitude EV1 of the exhaust valve 5 are set.

At step 1803, the engine cylinder 12, at which switching of combustion mode is initiated, is set. At step 1804, the open angle of the throttle valve 2 will is increased in the extent of TV1.

At step 1805, the processes is held waiting until the engine cylinder set for initiation of switching enters into the expansion stroke. When entry into expansion stroke of the relevant engine cylinder, the process is advanced to step 1806 to reduce the lifting magnitude of the exhaust valve 5 by EV1. Then, entry into compression stroke in the relevant engine cylinder 12 is waited. When the relevant engine cylinder enters into the compression stroke, the spark ignition timing is retarded from the compression ignition timing. Then, a sequence of operation is terminated.

Accordingly, the switching control portion 1102 of the exhaust control unit 10A calculates an appropriate internal EGR per operation range to set the lifting magnitude of the exhaust valve 5 for assuring transition to the compression ignition mode. Furthermore, by setting the target intake air flow rate depending upon the internal EGR amount to preliminarily open the throttle valve to prevent the air/fuel ratio from becoming rich to cause deterioration of the exhaust gas purification performance.

Furthermore, by retarding the spark ignition timing from the compression ignition timing, even when failure is caused in compression ignition upon switching transition from the spark ignition to the compression ignition, ignition can be caused by the spark ignition at the retarded timing for preventing deterioration of the exhaust gas purification performance due to misfiring.

FIG. 19 is a operational flowchart of the switching learning portion 1104 of the exhaust control unit 10A.

At step 1901, judgment is made whether deterioration of the exhaust gas purification performance is caused during the spark ignition mode operation or not. If deterioration of the exhaust gas purification performance is caused, namely the answer at step 1901 is YES, the process is advanced to step 1902. On the other hand, if deterioration of the exhaust gas purification performance is not caused, the process is advanced to step 1903.

At step 1902, learning is performed for reducing the target intake air flow rate. Namely, a factor for causing deterioration of the exhaust gas purification performance during spark ignition mode operation is excessively lean air/fuel mixture. Therefore, the target intake air flow rate is adjusted to be smaller. More particularly, by reducing the open angle EV1 of the throttle valve 2, deterioration of the exhaust gas purification performance can be avoided.

At step 1903, judgment is made whether deterioration of the exhaust gas purification performance in the compression ignition mode operation is caused or not. If deterioration of the exhaust gas purification performance is caused, namely when the answer at step 1903 is YES, the process is advanced to step 1904. If deterioration of the exhaust gas purification performance is not caused, the process is advanced to step 1905. Deterioration of the exhaust gas purification performance during compression ignition mode operation can be caused by insufficiency of EGR to cause incapability of elevating the temperature in the engine cylinder for compression ignition. Therefore, in such case, learning is made to increase the target EGR amount at step 1904. More particularly, by reducing the lifting magnitude EV1 of the exhaust valve 5, deterioration of the exhaust gas purification performance can be avoided.

Next, at step 1905, each learnt value set at step 1902 or 1904 is compared with a predetermined value determined by operation range of the throttle valve 2 and/or the exhaust valve 5 to check whether the learnt value is smaller than or equal to the predetermined value. If the learnt value is smaller than or equal to the predetermined value, namely the answer at step 1905 is YES, the sequence of operation is terminated. On the other hand, when the learnt value is in excess of the predetermined value, the process is advanced to step 1906 to inhibit switching in the corresponding operational range of the engine.

Accordingly, the switching learning portion 1104 of the exhaust control unit 10A can prevent deterioration of the exhaust gas purification performance by appropriately setting the control amount in intake air flow rate control upon spark ignition mode operation by learning and by appropriately setting the control amount of the internal EGR control during the compression ignition mode operation by learning. Furthermore, when a set value of the control amount by learning is in excess of the predetermined value range, switching in the relevant operational range of the engine is inhibited for preventing deterioration of the exhaust gas purification performance.

Here, in the switching learning portion 1104, switching from the spark ignition mode to the compression ignition mode is essentially performed in the air/fuel mixture condition at stoichiometric value. However, there are some exceptions.

Figure 20:
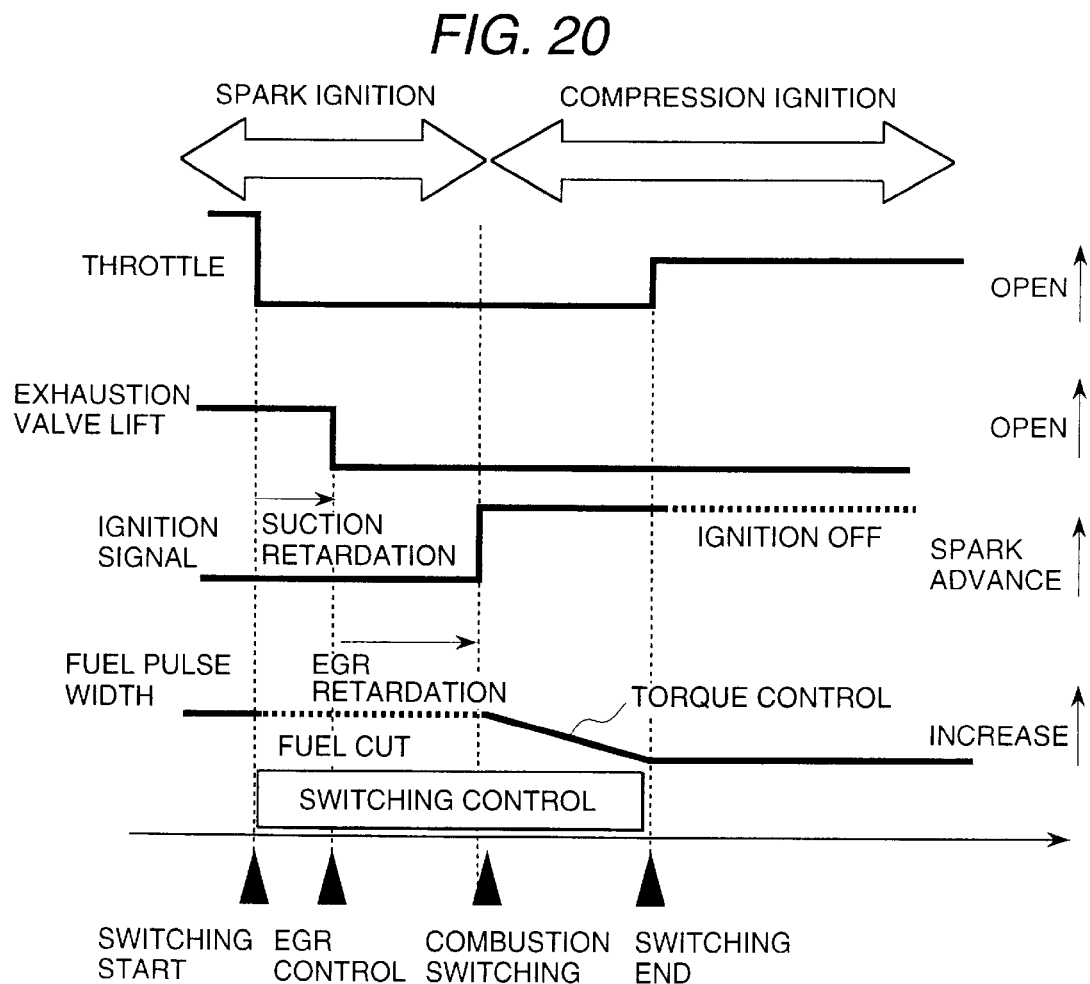
FIG. 20 is a view showing control signal 2 at the time of the combustion switching control in FIG. 11 (to the compression ignition from the spark ignition).

FIG. 20 shows one example of exceptions, and illustrates the case where fuel recovery after fuel cut-off operation is performed under compression ignition mode operation. Respective target values of operation magnitude of the throttle valve 2, the lifting magnitude of the exhaust valve 5, the spark ignition timing of the spark ignition plug 4 and the fuel injection pulse width of the fuel injector 3 in switching control from the spark ignition mode to the compression ignition mode upon fuel recovery are shown in time sequence (toward upward in the drawing, increasing of open angle of the throttle valve, increasing of the lifting magnitude, advancing of the spark ignition timing and increasing of the fuel injection pulse width are shown).

Here, there is illustrated an example, in which fuel cut-off is effected during deceleration, and subsequently, the fuel recovery is performed under compression ignition mode operation. When the throttle valve 2 is fully closed or reduced the open angle close to fully closed position and when the engine revolution speed is decelerated to be lower than or equal to a predetermined value, fuel supply is started to generate a driving torque by the compression ignition to enclose exhaust gas by reducing lifting magnitude of the exhaust valve 5 and by retarding the spark ignition timing of the engine cylinder 12, to which the fuel is injected, to transit to compression ignition.

Figure 21:
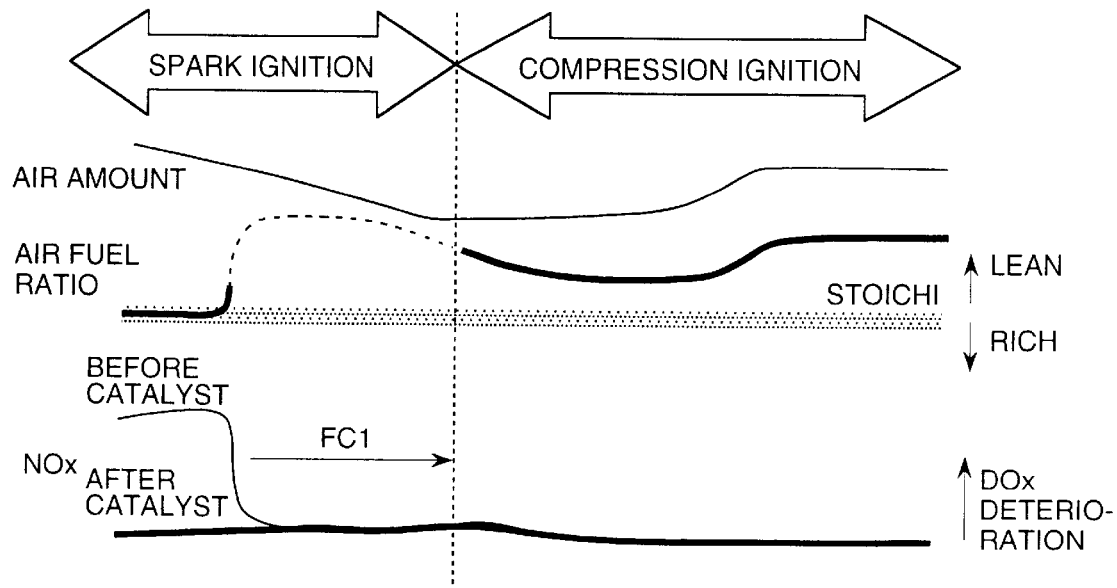
FIG. 21 shows output 1 from various Fig. as for sensor outputs 1 of FIG. 20.

FIG. 21 shows the intake air flow rate, the air/fuel ratio and $NO_x$ value upstream and downstream of the catalytic converter similar to FIG. 13.

At first, since no $NO_x$ is generated during fuel cut-off, a $NO_x$ detection values upstream and downstream of the catalytic converter 7 becomes 0. Accordingly, diagnosis and calibration of the $NO_x$ sensor 8 can be performed on the basis of the $NO_x$ value during fuel cut-off. This will be discussed later.

Figure 22:
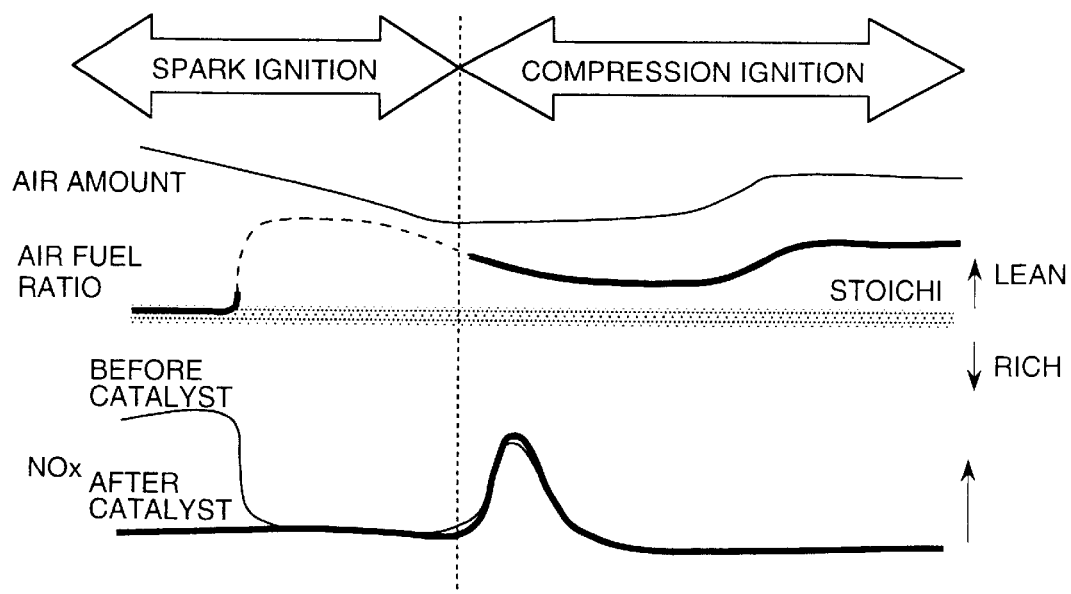
FIG. 22 is a view to which various sensor outputs 2 in the abnormal circumstances which depends on fuel recover control error of FIG. 20.

A problem to be encountered in switching, since combustion is not performed during fuel cut-off, the exhaust temperature can be lowered. Therefore, when fuel cut-off period is long, the compression ignition fails and the spark ignition by the retarded spark signal is effected for combustion to cause impulsive variation of the $NO_x$ concentration, as shown in FIG. 22. Accordingly, as shown in FIG. 21, a fuel cut-off period FC1 capable of fuel recovery under compression ignition is preliminarily derived through experiments or simulation so that fuel recovery is effected under the compression ignition if the fuel cut-off period falls within the predetermined fuel cut-off period (FC1), and otherwise, air/fuel ratio is controlled toward stoichiometric value to realize fuel recovery by spark ignition. When fuel recovery is performed under the compression ignition to impulsively increase $NO_x$, learning is performed to shorten the duel cut-off period FC1 to further certainly prevent deterioration of the exhaust gas purification performance.

Next, conversely from switching transition from the spark ignition mode to the compression ignition mode set forth above, discussion will be given for switching control from the compression ignition to the spark ignition by the switching learning portion 1104 of the exhaust control unit 10A.

Figure 23:
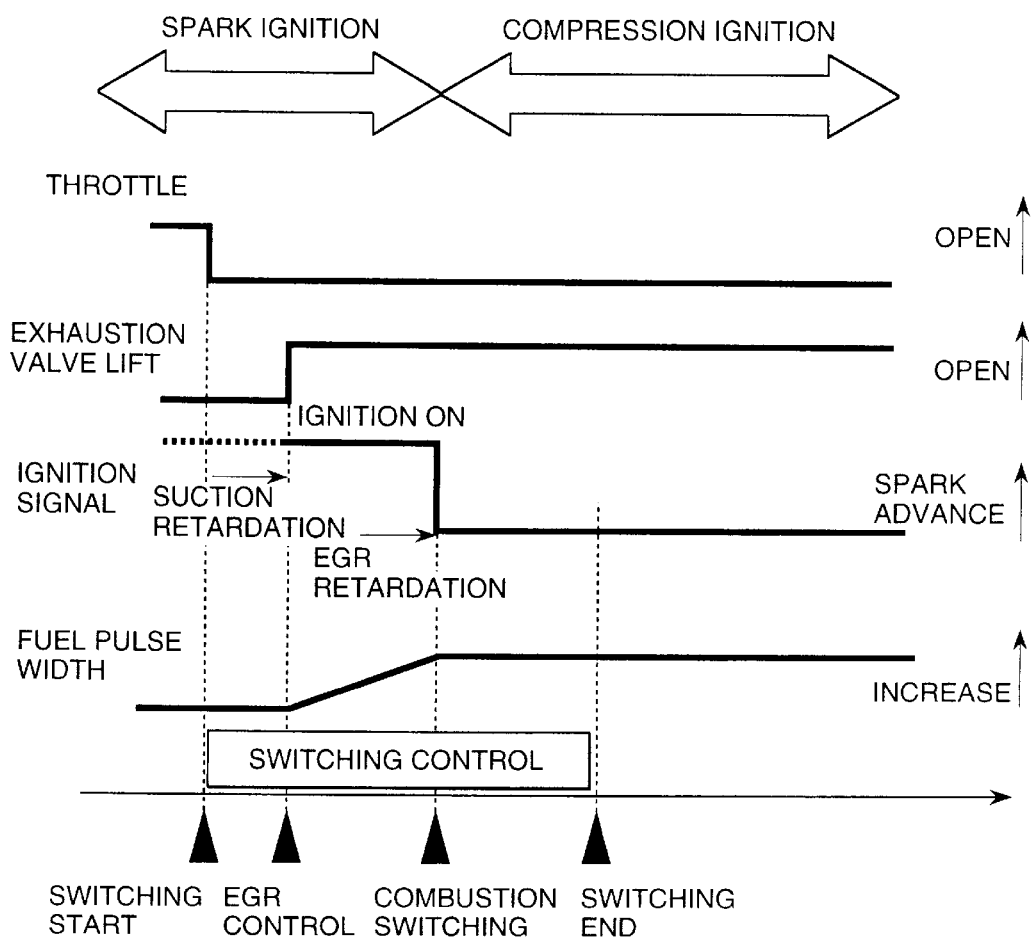
FIG. 23 is a view to which control signal 1 at the combustion switch control of FIG. 11 (jump spark ignition from the compression ignition) is shown.

FIG. 23 shows respective target values of operation magnitude of the throttle valve 2, the lifting magnitude of the exhaust valve 5, the spark ignition timing of the spark ignition plug 4 and the fuel injection pulse width of the fuel injector 3 in steady state in time sequence (toward upward in the drawing, increasing of open angle of the throttle valve, increasing of the lifting magnitude, advancing of the spark ignition timing and increasing of the fuel injection pulse width are shown).

On the basis of the switching demand from the compression ignition mode operation to the spark ignition mode operation, at first, the throttle valve 2 is fully closed or substantially fully closed for returning the air/fuel ratio toward stoichiometric value. Then, the lifting magnitude of the exhaust valve 5 is increased for reducing internal EGR. Then, the spark signal is turned ON for switching combustion mode to the spark ignition mode by advancing the spark signal per engine cylinder starting from the engine cylinder, from which the exhaust gas in the combustion chamber by the internal EGR is discharged. It should be noted that, at this time, since pumping loss is increased and combustion efficiency is lowered, the fuel injection pulse width during spark ignition mode operation is increased from the fuel injection pulse width during compression ignition mode to eliminate abrupt variation of the engine output torque.

Figure 24:
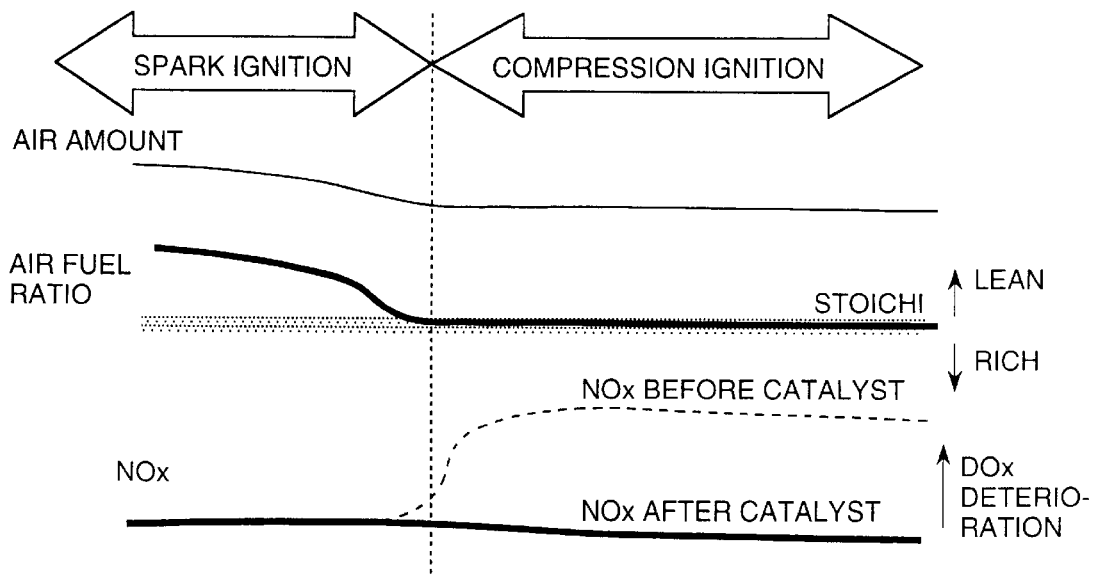
FIG. 24 shows sensor outputs 1 in normal condition in FIG. 23.

FIG. 24 shows intake air flow rate and the air/fuel ratio in the engine cylinder 12 upon execution of the shown control by the exhaust control unit 10A, $NO_x$ concentration upstream and downstream of the catalytic converter 7 in time sequence (toward upward of the drawing, increasing of intake air flow rate, making leaner the air/fuel ratio, increasing of $NO_x$ concentration).

As illustrated, the intake air flow rate is decreased upon switching from the compression ignition mode to the spark ignition mode, and the air/fuel ratio is varied from lean (or stoichiometric value) to stoichiometric value. On the other hand, $NO_x$ down stream of the catalytic converter 7 is held constant before and after switching. However, $NO_x$ upstream of the catalytic converter 7 is increased upon switching to the spark ignition mode operation.

Figure 25:
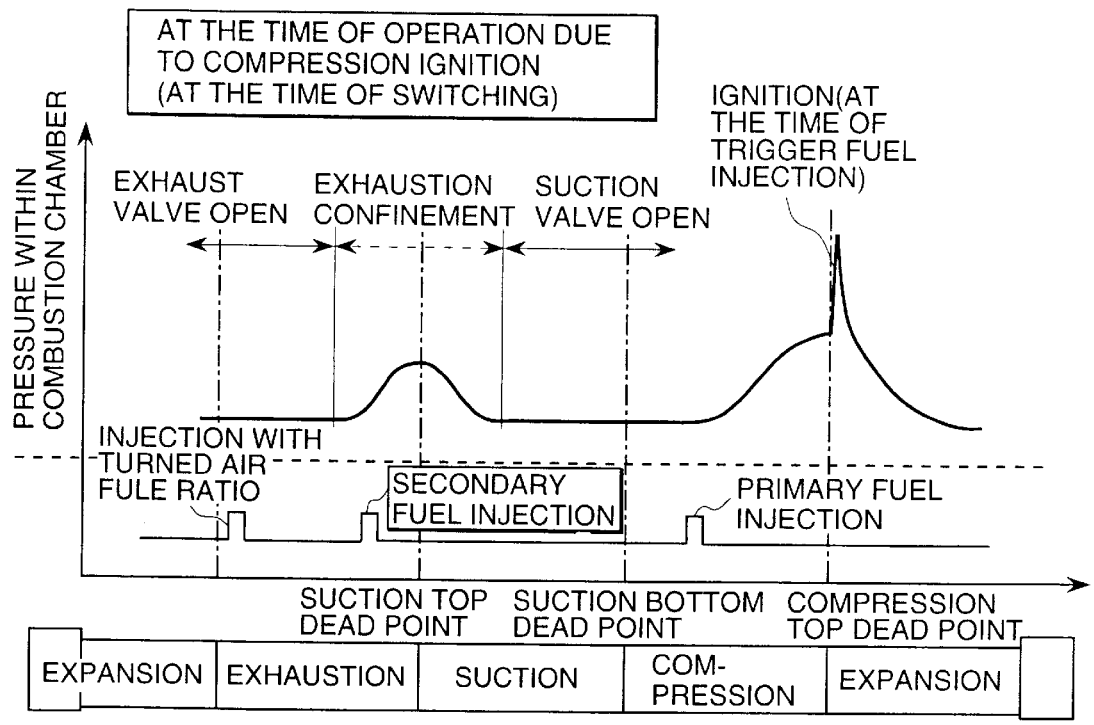
FIG. 25 is a view to which one-cycle control when the exhaust controller of FIG. 23 drives the compression ignition.

FIG. 25 shows one example for controlling the exhaust air/fuel ratio toward stoichiometric value during compression ignition mode operation by the exhaust control unit 10A.

The exhaust control unit 10A performs auxiliary fuel injection twice to perform by combining the air/fuel ratio during expansion stroke to the exhaust stroke in compression ignition mode operation to control the air/fuel ratio toward stoichiometric value.

The fuel by auxiliary fuel injection does not contribute for development of the engine output torque. Therefore, the exhaust air/fuel ratio can be controlled toward stoichiometric value without causing abrupt variation of the torque.

Figure 26:
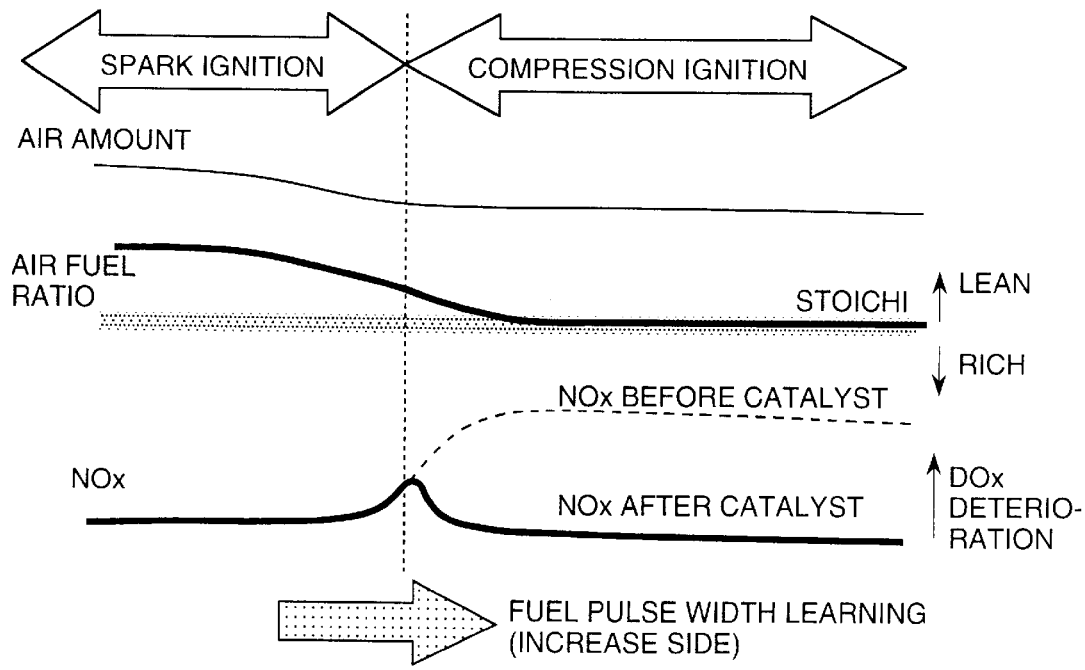
FIG. 26 is a view to which various sensor outputs 2 in the abnormal circumstances which depends on the fuel control mistake of FIG. 23.

FIG. 26 shows one example of deterioration of the exhaust gas purification performance upon switching transition from the compression ignition mode operation to the spark ignition mode operation.

This shows the condition at the occurrence of deterioration of $NO_x$ emission caused by effecting of the spark ignition before returning the air/fuel ratio to the stoichiometric value. Accordingly, in such case, by learning to increase the fuel amount adapting to the air/fuel ratio shown in FIG. 25, it becomes possible to prevent deterioration of the exhaust gas purification performance. In the alternative, while it takes longer period in switching transition, similar effect can be attained by providing a delay in timing for advancing the spark ignition timing.

Figure 27:
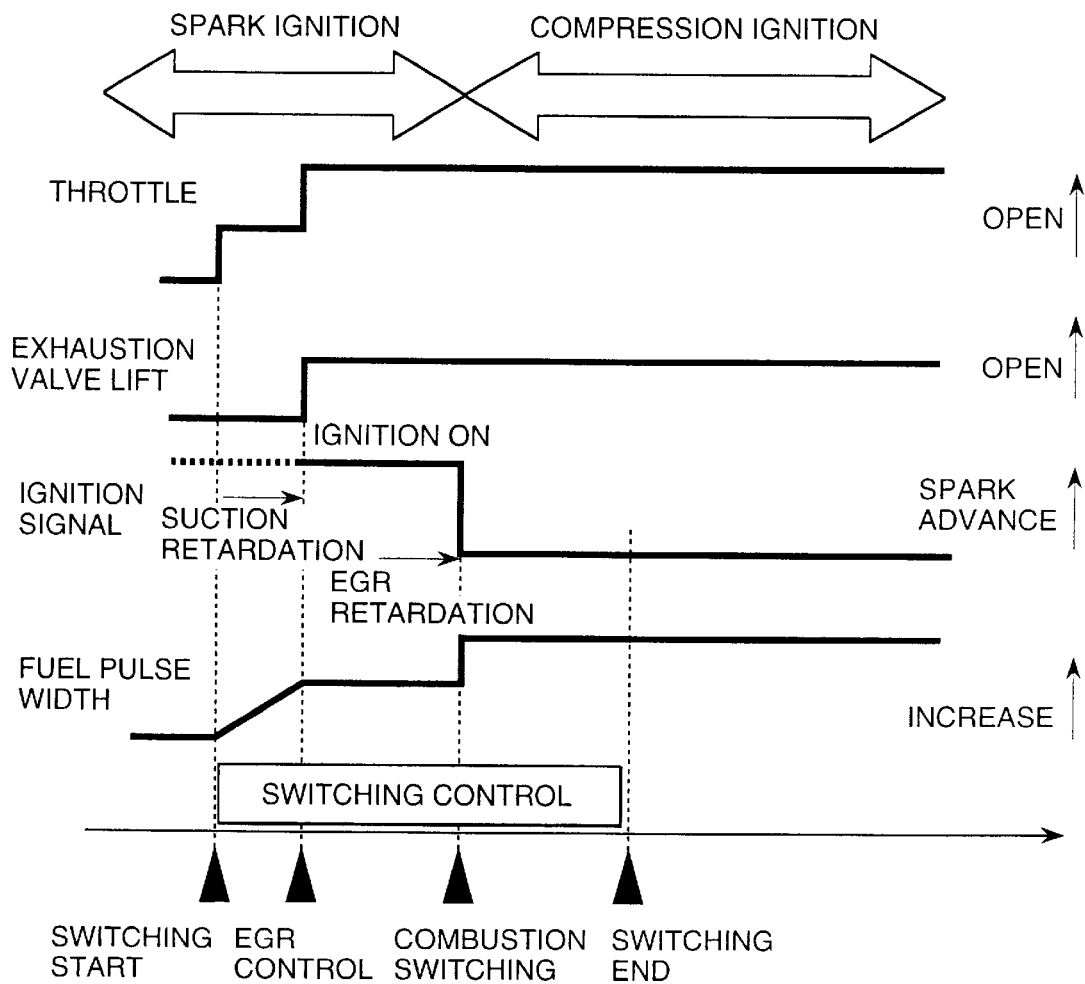
FIG. 27 is a view to which control signal 2 at the combustion switch control of FIG. 11 (jump spark ignition from the compression ignition) is shown.

Next, FIG. 27 shows one example of the case of switching from the compression ignition mode to the compression ignition mode in the switching control upon acceleration state of the vehicle.

Namely, combustion mode is switched from the compression ignition mode to the spark ignition mode by controlling the throttle valve open angle and the fuel injection pulse width toward the stoichiometric value in the compression ignition and reducing the exhaust gas in the engine cylinder by the internal EGR by increasing the lifting magnitude of the exhaust valve 5, and by advancing the spark signal. It should be preferred when torque shock at switching transition from the compression ignition to the spark ignition is significant, the torque shock can be reduced by setting the advancing angle of the spark ignition timing smaller than the target value.

Figure 28:
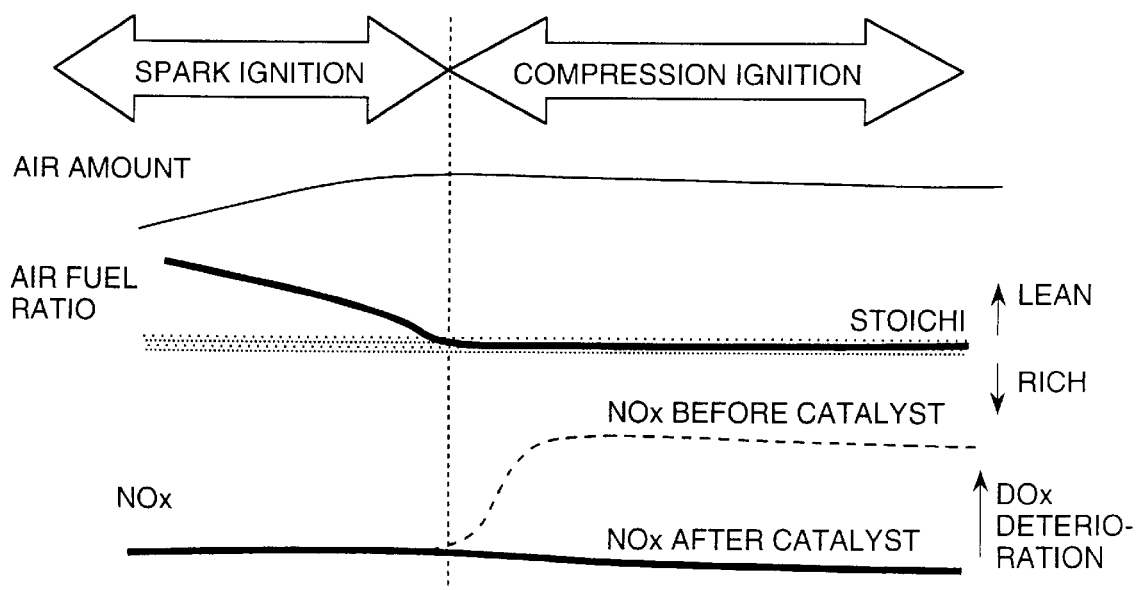
FIG. 28 is shows sensor outputs 1 in normal condition in FIG. 27.

FIG. 28 shows the intake air flow rate, the air/fuel ratio and $NO_x$ amount upstream and downstream of the catalytic converter when the shown control is performed by the switching control portion 1102.

The intake air flow rate is increased associating with demand for acceleration, and the air/fuel ratio is varied from lean to stoichiometric value. On the other hand, while $NO_x$ amount downstream of the catalytic converter 7 is constant before and after switching of the combustion mode. $NO_x$ amount upstream of the catalytic converter 7 is abruptly increased after switching to the spark ignition mode operation.

Figure 29:
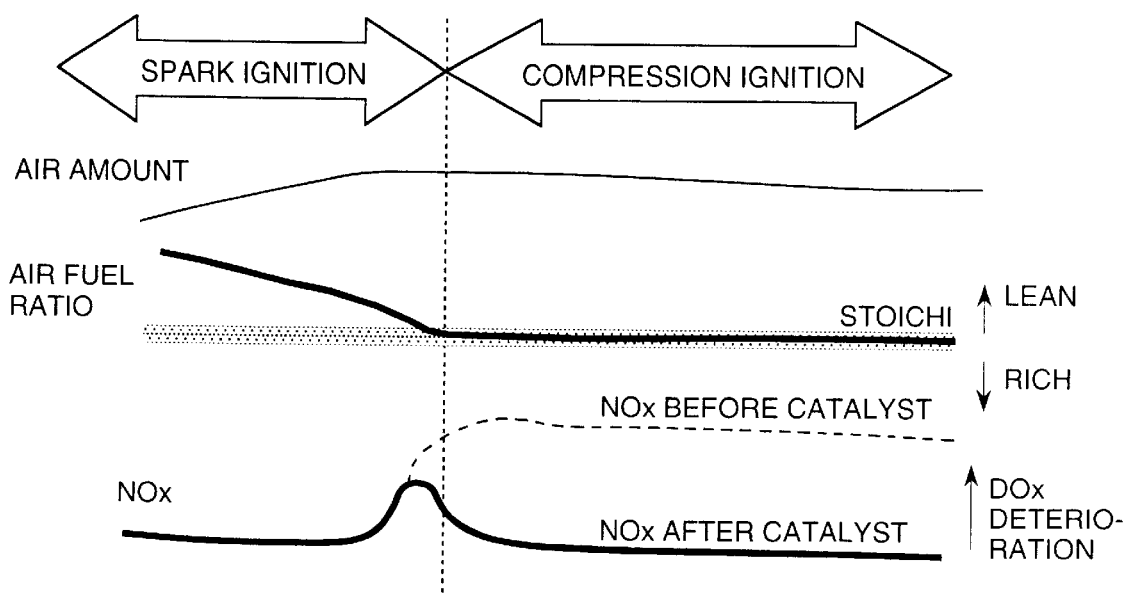
FIG. 29 is a view to which various sensor outputs 2 in the abnormal circumstances which depends on the control mistake of the fuel control mistake or the ignition time of FIG. 27 are shown.

FIG. 29 shows an example where deterioration of the exhaust gas purification performance upon switching of the combustion mode.

Here, it can be appreciated that spark ignition is effected under lean air/fuel mixture condition to cause impulsive increase of the discharge amount of $NO_x$ upon switching from the compression ignition mode to the spark ignition mode.

Accordingly, in order to prevent deterioration of the exhaust gas purification performance, it becomes necessary to learn to increase enrichment amount of the fuel injection amount or delaying advancing timing of the spark ignition timing as in the switching control portion 1102.

Next, discussion will be given for the exhaust control during the compression ignition mode operation by the exhaust control unit 10A.

FIG. 30 is an operational flowchart for preventing deterioration of the exhaust gas purification performance by detecting abnormality of combustion in compression ignition mode operation by means of the $NO_x$ sensor and improving combustion or inhibiting the compression ignition at the occurrence of deterioration of combustion.

At step 3001, diagnosis of the $NO_x$ sensor 8 and the catalytic converter 7 is performed. This will be discussed later. For example, the diagnosis is performed by the $NO_x$ sensor diagnosing means provided in the exhaust control unit 10A for diagnosing abnormality of the $NO_x$ sensor 8.

At step 3002, check is effected if failure of the $NO_x$ sensor 8 and fatigue of the catalytic converter is caused or not. If failure or fatigue is not caused, namely answer at step 3002 is YES, the process is advanced to step 3003. On the other hand, failure or fatigue is caused, the sequence of operation is terminated.

At step 3003, check is effected whether the current operation mode is the compression ignition mode and the air/fuel ratio is lean. If the current operation mode is the compression ignition mode and the air/fuel ratio is lean, namely the answer at step 3003 is YES, the process is advanced to step 3004. On the other hand, the current operation mode is nor the compression ignition mode or the air/fuel mixture is not lean, the sequence of operation is terminated.

At step 3004, the $NO_x$ detection value is compared with the combustion deterioration threshold value $NO_xHL$. The combustion deterioration threshold value $NO_xHL$ is a value determined by a detection criterion. If the $NO_x$ detection value is greater than or equal to the combustion deterioration threshold value $NO_xHL$, namely the answer at step 3004 is YES, the process id advanced to step 3005. On the other hand, when the $NO_x$ detection value is less than the combustion deterioration threshold value $NO_xHL$, the sequence of operation is terminated.

At step 3005 and subsequent steps, control is performed for atomization of the fuel or homogenizing the air/fuel mixture in order to improve combustion in the compression ignition mode Particularly, the exhaust control unit 10A includes combustion deterioration detecting means for detecting deterioration of combustion on the basis of the detection value of the $NO_x$ sensor 8 in the compression ignition mode operation, and combustion improvement control means for effecting improvement of combustion in the compression ignition mode when deterioration of combustion is detected by the combustion deterioration detecting means. When the deterioration of combustion is detected by the combustion deterioration detecting means, the combustion improvement control means controls the air/fuel ratio so that the output of the air/fuel ratio sensor 6 indicates the stoichiometric value.

Namely, at step 3005, by the combustion improvement control means, a fuel pressure is increased to be higher than normal condition, or a tumble control value or swirl control valve is adjusted toward closing side than normal condition to enhance swirl flow in the combustion chamber. In the alternative, the air/fuel ratio upon compression ignition is adjusted toward lean side or EGR amount is increased to implement control for homogenizing the air/fuel mixture. If combustion is still not improved (when the $NO_x$ detection value is less than or equal to the predetermined value and abnormality of the $NO_x$ sensor 8 is judged), for burning deposit on the fuel injector 3, combustion mode is switched to the spark ignition to inhibit compression ignition until the high load operation is performed for a given period. Then, after performing the combustion improvement control, the process is advanced to step 3006 to check whether combustion improvement is effective or not. If combustion improvement is effective, the sequence of operation is terminated. When the combustion improvement is not effective, the process is advanced to step 3007 to control the air/fuel ratio so that the output of the air/fuel ratio sensor 6 indicates stoichiometric value even in the compression ignition mode operation for purification of the exhaust gas by the catalytic converter 7.

Next, discussion will be given for the diagnosis unit 10B of ECU 10.

ECU 10 in the shown embodiment includes the diagnosis unit 10B to perform diagnosis of fatigue of the $NO_x$ sensor 8 on the basis of the output signal of the $NO_x$ sensor 8 provided at a position downstream of the catalytic converter in order to prevent deterioration of the exhaust gas purification performance.

Figure 31:
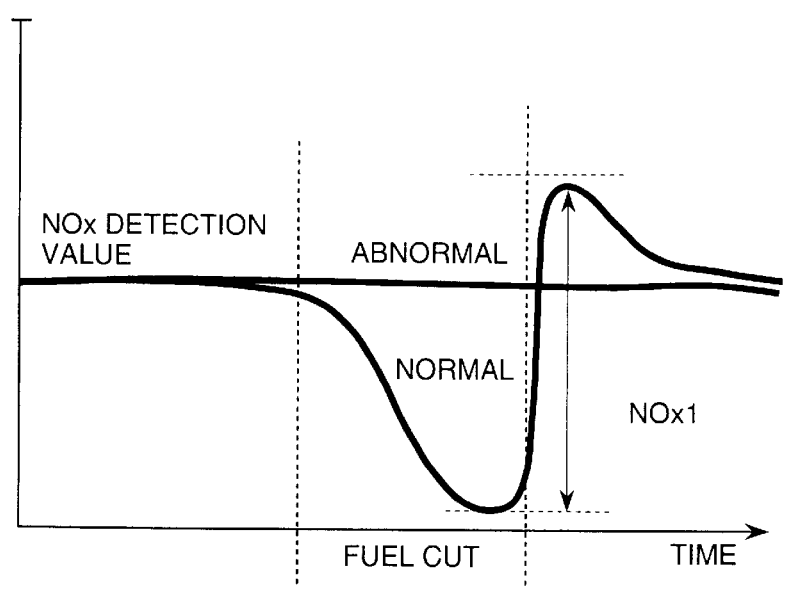
FIG. 31 is a view to which the $NO_x$ sensor diagnosis with the diagnosis device of FIG. 30.

Particularly, diagnosis of the $NO_x$ sensor performed at step 3001 of FIG. 30 on the basis of the $NO_x$ detection value during fuel cut-off condition by interrupting fuel injection during deceleration state by fuel cut-off means in ECU 10 as illustrated in FIG. 31. Namely, since combustion is not effected during fuel cut-off state, $NO_x$ is not discharged. Thus, the $NO_x$ detection value becomes 0 during fuel cut-off state, the air/fuel ratio in the catalytic converter becomes lean upon fuel recovery by fuel recovery means in ECU 10 to frequently discharge a little amount of $NO_x$. Accordingly, fatigue condition of the $NO_x$ can be judged by deriving a difference $\Delta NO_x1$ between a lower limit value of the $NO_x$ detection value during fuel cut-off and the $NO_x$ detection value during fuel recovery, more particularly a peak value of $NO_x$ immediately after fuel recovery and checking whether the difference is smaller than or equal to the predetermined value.

Figure 32:
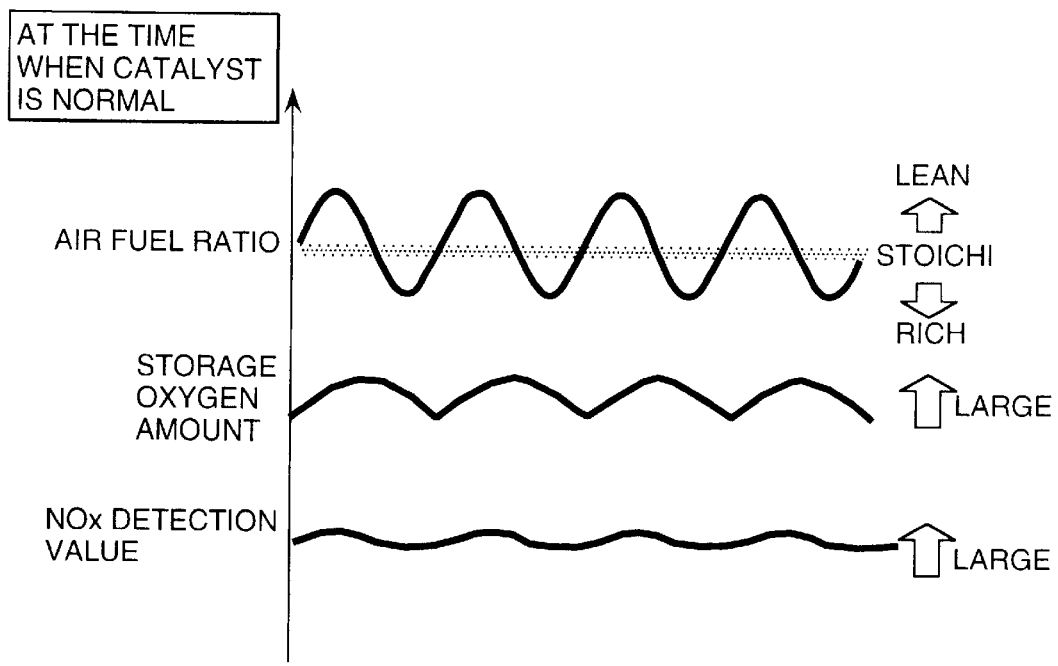
FIG. 32 is a view to which the catalyst diagnosis of the three way catalyst with the diagnosis device of FIG. 30 when it is normal.

On the other hand, diagnosis of fatigue of the catalytic converter performed at step 3001 of FIG. 30 may be performed using respective outputs of the air/fuel ratio sensor 6 located upstream side of the catalytic converter 7 and the $NO_x$ sensor 8 located downstream side of the catalytic converter 7 as a relationship between the air/fuel ratio upstream side of the catalytic converter, the oxygen storage amount in the catalytic converter and the $NO_x$ detection amount in the normal state of catalytic converter as shown in FIG. 32, for example. If the catalytic converter 7 is normal, even when the air fuel ratio is offset toward lean side or rich side from the stoichiometric value, little variation is caused in $NO_x$ amount downstream of the catalytic converter since oxygen is stored in the catalytic converter 7.

Figure 33:
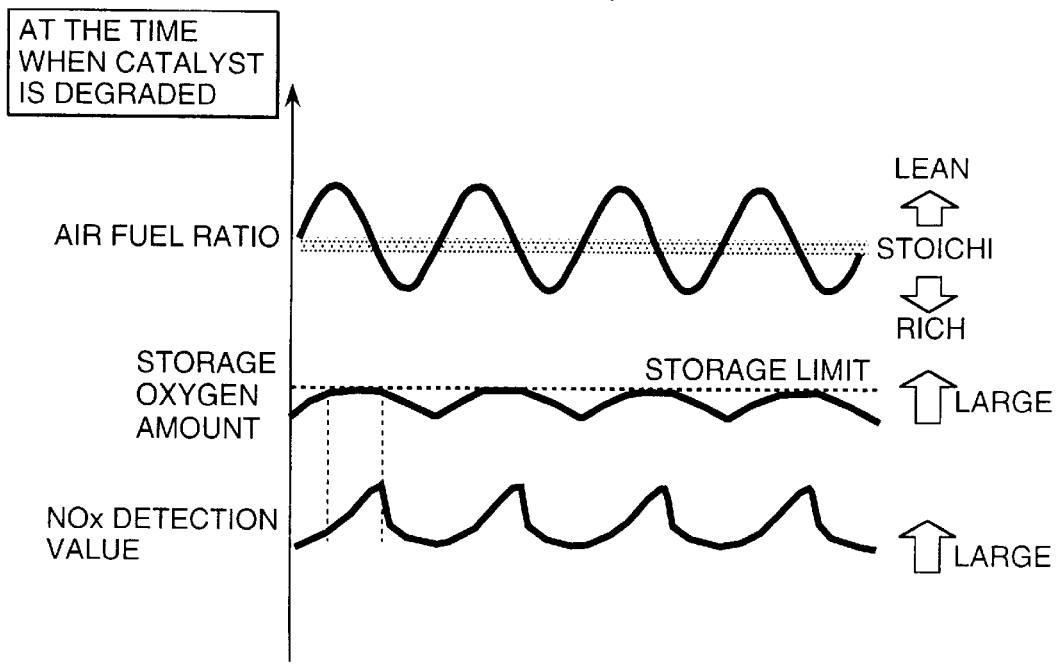
FIG. 33 is a view to which the catalyst diagnosis with the diagnosis device of FIG. 30 when the three way catalyst is abnormal.

On the other hand, as shown in FIG. 33, when fatigue of the catalyst converter is progressed, the oxygen storage limit for storing oxygen becomes lowered. If the oxygen storage limit is exceeded, $NO_x$ cannot be purified within the catalytic converter resulting in detection of the impulsive increase of $NO_x$.

Accordingly, the air/fuel ratio control means provided in ECU 10 controls the air/fuel ratio so that the output of the air/fuel ratio sensor 6 becomes closer to the target air/fuel ratio. Then, the diagnosis unit 10B performs diagnosis for detecting fatigue of the catalytic converter on the basis of the output signal of the $NO_x$ sensor 8 when the target air/fuel ratio is set at stoichiometric value. For example, when a correlation between variation amplitude of the air/fuel ratio and the $NO_x$ detection value exceeds the predetermined value, or when a power of a high frequency characteristics when the $NO_x$ detected value is subject to frequency conversion, exceeds a predetermined value, fatigue of the catalytic converter is detected.

On the other hand, detection of deterioration of combustion to be performed at step 3004 of FIG. 30, is also performed by the diagnosis unit 10B. Namely, the diagnosis unit 10B detects the detection value of the $NO_x$ sensor 8 during the compression ignition mode operation and detection in deterioration of combustion is performed from comparison with the combustion deterioration threshold value. More particularly, when the output of the air/fuel ratio sensor 6 indicates lean mixture condition, combustion deterioration detecting means for performing detection of the combustion deterioration in compression ignition including the diagnosis unit 10B detects deterioration of combustion through comparison.

As set forth above, each embodiment of the present invention achieves the following functions with the construction set forth above.

Namely, in the exhaust control unit 10A of the shown embodiment of ECU 10, the $NO_x$ sensor 8 is arranged downstream side of the catalytic converter in the exhaust passage 13 for monitoring exhaust gas purification condition upon transition in switching combustion mode between the spark ignition mode and the compression ignition mode, during spark ignition mode and during compression ignition mode for preventing deterioration of exhaust gas purification performance during each combustion mode operation and at switching transition. Furthermore, since the diagnosis unit 10B of ECU 10 can perform diagnosis of the $NO_x$ sensor 8 and the catalytic converter 7 and diagnosis of combustion upon compression ignition, deterioration of exhaust gas purification performance even in fatigue of each component can be successfully prevented.

Also, since the foregoing construction to prevent deterioration of the exhaust gas purification performance by ECU 10 can be a minimum system in the compression self-ignition engine, it contributes for lowering of manufacturing cost of the engine.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, in the foregoing embodiment, there is shown a method for increasing the internal EGR amount by increasing enclosed exhaust gas amount by varying the lifting magnitude and the lifting period in the intake and exhaust valves 5 during compression ignition mode operation in FIG. 6. It is also possible to perform control of the internal EGR by a method of increasing the internal EGR by blowing back the exhaust gas toward intake side by increasing valve overlap of the intake and exhaust valves 5. Also, it is further possible to provide typical EGR passage connecting the air intake passage 12 and the exhaust passage 13 for external EGR for achieving the similar effect.

Figure 34:
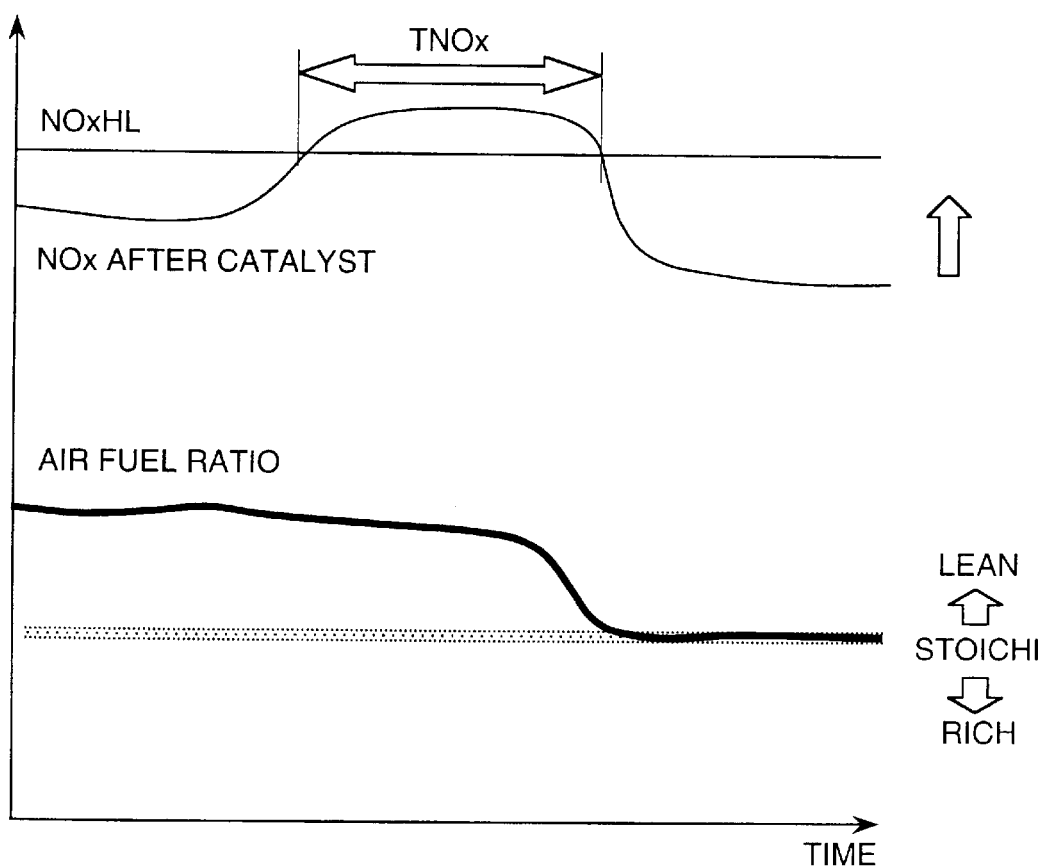
FIG. 34 is a view to which the $NO_x$ sensor output when combustion with the diagnosis device of FIG. 30 deteriorates.

On the other hand, at step 3004 of FIG. 30, in order to avoid influence of noise of the $NO_x$ sensor 8, it is possible to compare weighted average value of the detection value of $NO_x$ and the predetermined value. Furthermore, as shown in FIG. 34, it is possible to transit from step 3004 to step 3005 when the $NO_x$ detection value exceeds $NO_xHL$ for a period longer than the predetermined period $TNO_x$.

As can be appreciated from the discussion given hereinabove, the control system of the compression ignition engine performs exhaust control and diagnosis on the basis of the output signal of the $NO_x$ sensor provided at the position downstream of the catalytic converter. Thus, the engine can be constructed with the minimum system with successfully preventing deterioration of exhaust gas purification performance upon the compression ignition mode operation in addition to switching transition of the combustion mode. Furthermore, diagnosis of $NO_x$ sensor and the catalytic converter can also be performed.

What is claimed is:

1. A control system for a compression ignition engine comprising:
    an ignition coil for igniting a spark;
    a catalytic converter installed within an exhaust passage of the compression ignition engine, said compression ignition engine functioning in a compression ignition mode and an spark ignition compression mode for compressing and igniting a pre-mixture of a fuel and air;

an air/fuel ratio detector for detecting an air/fuel ratio at upstream side of said catalytic converter; and an $NO_x$ detector for detecting $NO_x$ at downstream side of said catalytic converter.

2. A control system for a compression ignition engine as set forth in claim 1, wherein said control system uses an output signal of said $NO_x$ detector for preventing deterioration of exhaust gas purification performance.

3. A control system for a compression ignition engine as set forth in claim 1, wherein said control system prevents deterioration of exhaust gas purification performance using an output signal of said $NO_x$ detection upon switching transition of combustion mode between said spark ignition mode and said compression ignition mode, during spark ignition mode combustion and during compression ignition mode combustion.

4. A control system for a compression ignition engine as set forth in claim 1, wherein said control system further comprises:

combustion mode switching means for switching between a spark ignition mode and compression ignition mode;

exhaust deterioration factor predicting means for predicting a factor causing deterioration of exhaust gas purification performance on the basis of an $NO_x$ detection value upon switching transition of the combustion mode; and switching learning means for leaning control amount and control object of said combustion mode switching means on the basis of said factor causing deterioration of exhaust gas purification performance.

5. A control system for a compression ignition engine as set forth in claim 4, wherein said switching learning means learns a spark ignition timing.

6. A control system for a compression ignition engine as set forth in claim 4, wherein said switching learning means learns a throttle valve control amount.

7. A control system for a compression ignition engine as set forth in claim 4, wherein said switching learning means learns a fuel injection amount.

8. A control system for a compression ignition engine as set forth in claim 4, wherein said switching leaning means learns a fuel cut-off period before switching to said compression ignition mode combustion.

9. A control system for a compression ignition engine as set forth in claim 4, wherein said switching learning means learns one of a target intake air flow rate and a target EGR amount.

10. A control system for a compression ignition engine as set forth in claim 4, wherein said switching learning means learns an engine operational range for switching combustion mode between said spark ignition mode combustion and said compression ignition mode combustion.

11. A control system for a compression ignition engine as set forth in claim 1, wherein said control system performs fuel injection between an expansion stroke and an exhaust stroke in said compression ignition mode combustion.

12. A control system for a compression ignition engine as set forth in claim 1, wherein said control system comprises:

air/fuel ratio control means for controlling an output of said air/fuel ratio detector toward a target air/fuel ratio;

a target air/fuel ratio calculating means for calculating said target air/fuel ratio for optimizing purification ratio of said catalytic converter, said target air/fuel ratio calculating means calculates said target air/fuel ratio on the basis of an output signal of said $NO_x$ detector.

13. A control system for a compression ignition engine as set forth in claim 12, wherein said control system temporarily sets said target air/fuel ratio rich side when said $NO_x$ detection value exceeds a predetermined value.

14. A control system for a compression ignition engine as set forth in claim 1, wherein said control system comprises $NO_x$ detector diagnosis means for diagnosing abnormality of said $NO_x$ detector for controlling the air/fuel ratio so that an output of said air-fuel ratio detector becomes stoichiometric value.

15. A control system for a compression ignition engine as set forth in claim 1, wherein said control system comprises combustion deterioration detecting means for detecting deterioration of combustion on the basis of an $NO_x$ detection value in said compression ignition mode combustion.

16. A control system for a compression ignition engine as set forth in claim 15, wherein said combustion deterioration detecting means detects deterioration of combustion in said compression ignition mode combustion when an output of said air/fuel ratio detector indicates a lean mixture condition.

17. A control system for a compression ignition engine as set forth in claim 15, wherein said control system comprises combustion improvement control means for controlling improvement of combustion in said compression ignition mode when deterioration of combustion is detected by said combustion deterioration detecting means.

18. A control system for a compression ignition engine as set forth in claim 17, wherein said control system controls the air/fuel ratio so that the output of said air/fuel ratio detector becomes stoichiometric value when deterioration of combustion is detected by said exhaust deterioration detecting means after implementation of said combustion improvement control means.

19. A control system for a compression ignition engine as set forth in claim 1, wherein said control system comprises air/fuel ratio detector diagnosing means for detecting abnormality of said air/fuel ratio detector, for correcting a fuel injection amount on the basis of said output signal of said $NO_x$ detector when abnormality of said air/fuel ratio detector is detected.

20. A control system for a compression ignition engine as set forth in claim 1, wherein said control system prevents deterioration of exhaust gas purification performance by detecting fatigue of at least one of said $NO_x$ detector and said catalytic converter.

21. A control system for a compression ignition engine as set forth in claim 20, wherein said control system comprises fuel cut-off means for interrupting fuel injection during deceleration, and fatigue of $NO_x$ detector is detected on the basis of the output signal of said $NO_x$ detector during fuel cut-off.

22. A control system for a compression ignition engine as set forth in claim 21, wherein said control system comprises fuel recovery means for recovering fuel injection after fuel cut-off, abnormality of said $NO_x$ detector is judged when a difference said $NO_x$ detection value during fuel recovery and said $NO_x$ detection value during fuel cut-off is less than or equal to a predetermined value.

23. A control system for a compression ignition engine as set forth in claim 20, wherein said control system comprises air/fuel ratio control means for controlling air/fuel ratio so that an output of said air/fuel ratio detector becomes close to a target air/fuel ratio, for diagnosis of fatigue of said catalytic converter on the basis of the output signal of said $NO_x$ detector when said target air/fuel ratio is set at stoichiometric value.

24. An automotive vehicle having a control system for a compression ignition engine defined in claim 1.

* * * * *